(12) United States Patent
Passarotto et al.

(10) Patent No.: US 7,425,041 B2
(45) Date of Patent: Sep. 16, 2008

(54) BICYCLE WHEEL BALANCED BY SPOKE CONNECTIONS OF DIFFERENT MASS

(75) Inventors: Maurizio Passarotto, Rovigo (IT); Davide Urbani, Montecchio Maggiore (IT)

(73) Assignee: Campagnolo, S.r.l., Vicenza (IT)

( * ) Notice: Subject to any disclaimer, the term of this patent is extended or adjusted under 35 U.S.C. 154(b) by 294 days.

(21) Appl. No.: 11/215,941

(22) Filed: Aug. 31, 2005

(65) Prior Publication Data

US 2006/0043783 A1    Mar. 2, 2006

(30) Foreign Application Priority Data

Aug. 31, 2004    (EP)    ................... 04425652

(51) Int. Cl.
*B60B 1/02*    (2006.01)
*B60B 19/00*    (2006.01)

(52) U.S. Cl. ................... 301/55; 301/5.21; 301/58; 301/59

(58) Field of Classification Search ............... 301/5.21, 301/37.41, 55, 58, 59, 104, 56, 110.5; 295/6
See application file for complete search history.

(56) References Cited

U.S. PATENT DOCUMENTS

| | | | | | |
|---|---|---|---|---|---|
| 304,809 | A | * | 9/1884 | Esplin | ................... 74/434 |
| 420,842 | A | * | 2/1890 | Vauclain | ................... 301/5.21 |
| 707,335 | A | * | 8/1902 | Kenyon | ................... 295/6 |
| 1,579,984 | A | * | 4/1926 | Werst | ................... 295/6 |
| 1,684,290 | A | * | 9/1928 | Starling | ................... 301/5.21 |
| 1,889,557 | A | * | 11/1932 | Hellmuth | ................... 222/90 |
| 1,960,039 | A | * | 5/1934 | Wintemberg | ................... 295/6 |
| 2,222,982 | A | * | 11/1940 | Mangels | ................... 295/6 |
| 2,269,670 | A | | 1/1942 | Kieckbusch | |
| 3,894,777 | A | * | 7/1975 | Yamada | ................... 301/104 |
| 5,647,642 | A | * | 7/1997 | Word | ................... 301/5.21 |
| 6,048,035 | A | | 4/2000 | Chen | |
| 6,189,978 | B1 | * | 2/2001 | Lacombe et al. | ................... 301/104 |
| 6,267,450 | B1 | | 7/2001 | Gamble | |
| 6,783,192 | B2 | | 8/2004 | Meggiolan | |
| 7,267,410 | B2 | * | 9/2007 | Ito et al. | ................... 301/5.21 |
| 2002/0117889 | A1 | | 8/2002 | Cheng | |
| 2002/0133635 | A1 | | 9/2002 | Schechter et al. | |
| 2004/0007912 | A1 | | 1/2004 | Amyot et al. | |
| 2004/0113484 | A1 | | 6/2004 | Meggiolan | |
| 2004/0174066 | A1 | * | 9/2004 | Dietrich | ................... 301/104 |

FOREIGN PATENT DOCUMENTS

| | | |
|---|---|---|
| DE | 8915288 U1 | 3/1990 |
| DE | 29811076 U1 | 8/1998 |
| EP | 0 936 085 | 8/1999 |
| EP | 1 231 077 A2 | 8/2002 |
| EP | 1559581 A | 8/2005 |
| EP | 1559583 A | 8/2005 |
| GB | 2345035 | 6/2000 |
| WO | 2004101294 A | 11/2004 |

\* cited by examiner

*Primary Examiner*—Russell D Stormer
(74) *Attorney, Agent, or Firm*—Volpe and Koenig, P.C.

(57) ABSTRACT

A spoked bicycle wheel is presented where the masses of a set of spoke connections for connection of a hub and a rim as a whole are imbalanced with respect to the rotational axis. In such a way the dynamic imbalance of the wheel due to localized mass increases at the valve and at a possible joint is reduced or eliminated.

15 Claims, 15 Drawing Sheets

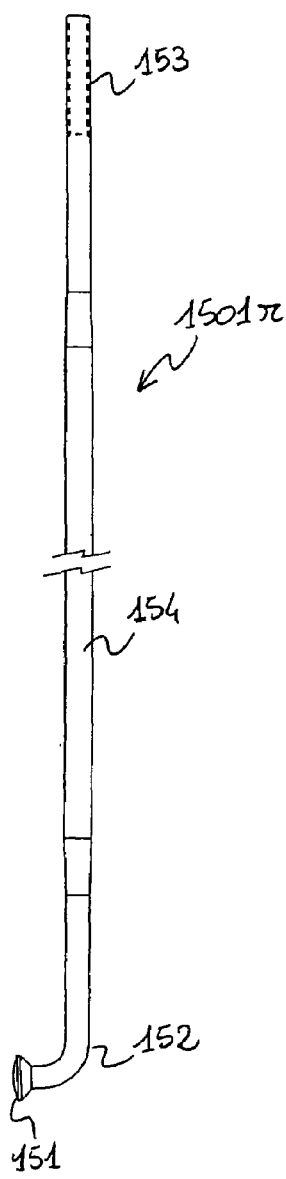
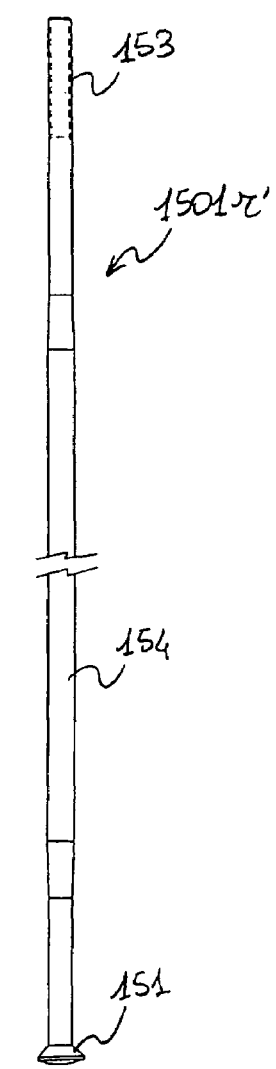
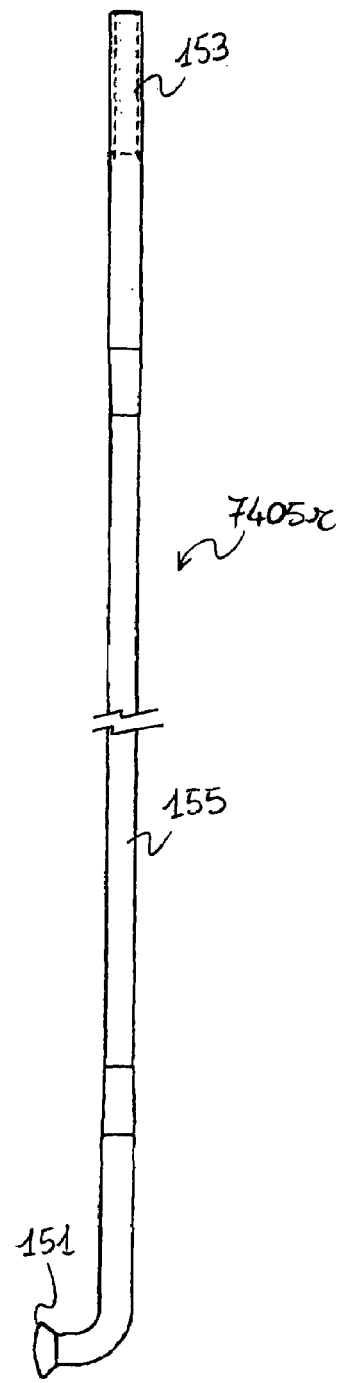
FIG. 6
FIG. 7
FIG. 14

BICYCLE WHEEL BALANCED BY SPOKE CONNECTIONS OF DIFFERENT MASS

FIELD OF THE INVENTION

The present invention concerns in general the field of spoked bicycle wheels, and in particular a wheel, a set of spoke connections and a spoke therefor, as well as a method for manufacturing the wheel and the spoke.

BACKGROUND OF THE INVENTION

A spoked bicycle wheel conventionally comprises a rim, a hub and a set of spoke connections between the rim and the hub.

More specifically, for the connection between rim and hub, a spoke having a widened head at a first end and an outer threading at a second end opposite the first end is typically provided.

The widened head of the spoke is received in a suitably shaped seat, usually made at the hub or at a flange thereof. In order to allow the extension of the spoke in the radial or substantially radial direction, a bend is typically provided close to the first end of the spoke. The bend of the spoke at the first end can, however, be left out.

The threading at the second end of the spoke is coupled in a threaded hole usually made at the rim or, preferably, in a removable connection element of the nipple type or nut type, which abuts at seating holes in the rim, possibly through the interposition of a plate.

Spokes with different attachment means to the rim and to the hub are also known, for example where the head of the spoke is intended to couple with the rim, and the threading of the spoke is intended to couple with the hub, and the present invention is not limited to any particular type of spoke connection.

In the present invention and in the attached claims, the expression "spoke connection" is meant to indicate the assembly of a spoke and possible removable connection elements, such as the aforementioned nipple and interposition plate.

The hub is an element with rotational symmetry with respect to the axis of the bicycle wheel, and the spoke connections are always so distributed along the circumference of the wheel that the center of mass of them as a whole is at the axis of the wheel. More specifically, the spoke connections can be distributed equally spaced apart, or can be distributed equally spaced apart along the rim in groups of two or more spoke connections.

Due to the different angle of the spoke connections with respect to the median plane of the wheel (camber) between one side and the other of the hub and/or due to a tangential attachment of the spokes to a side of the hub and/or for other reasons in particularly complex spoke patterns, there can be spoke connections of varying masses, but still forming regular, with respect to the rotation axis, sub-sets of identical spoke connections. Also in such cases, the center of mass of the set of spoke connections is therefore at the rotation axis of the wheel, in other words the set of spoke connections is balanced with respect to the rotation axis.

The known geometries of rims are such that also the rim is an element with rotational symmetry with respect to the axis of the wheel.

In first analysis, the wheel is therefore dynamically balanced.

In practice, there is however always a cause for an imbalance or a localized mass increase, caused by the valve that retains the air inside the pneumatic tire, be it of the type with an inner tube, of the tubeless type or of the type with a tubular tire. The valve, fixed in a proper hole formed in the rim, is typically made of brass and has standard size and therefore predetermined weight. The slight lightening of the rim as a result of the housing hole provided for the valve is insufficient to compensate for the localized mass increase of the valve itself. On the contrary, in rims obtained by carbon fiber molding, the localized mass increase at the valve is sometimes accompanied by a further increase in mass due to the presence of a greater thickness of the rim in such a zone in order to compensate for the weakening of the rim due to the hole for the valve.

The cause for imbalance provided by the valve is accompanied, in the case of metal rims, by a second cause. Metal rims, in particular those made of steel or aluminum alloy, are made through a rod extruded according to the desired section of the rim, said rod then being shaped into a circumference by calendaring. The jointing of the ends of the rod is carried out in various ways, all of which however provide for the addition of material and therefore determine a localized mass increase. For example, known methods for carrying out jointing provide for: the insertion with interference of one or more pins in respective holes butt formed in the wall of the ends of the extruded rod; the insertion of a sleeve in an inner chamber of the extruded rod for a certain extent from both ends, possibly with the addition of an adhesive; and the butt welding of the ends, carried out with or without addition of welding material, but in any case, using solid metal inserts in the inner chamber of the extruded rod in order to allow for gripping the ends with suitable pincers during welding without the risk of deforming the rim.

One or both of the causes for localized mass increase bring about that the center of mass of the masses of the wheel does not belong to the rotation axis of the wheel. From a dynamic point of view, the imbalance caused by such localized mass increases brings about an unfavourable instability of the wheel. Moreover, given that the imbalance increases as the speed of the wheel increases, it becomes more dangerous precisely when a very stable wheel is needed, i.e. when the travel speed is fast, like when going downhill.

In the case of metal rims, to reduce the problem of dynamic imbalance, it is known to make the hole for the valve in a position diametrically opposite the joint of the extruded rod. The balancing of the masses in movement thus obtained is, however, insufficient to provide good stability of the wheel since typically the additional mass in the zone of the joint is different from, normally greater than, the mass of the valve body. Moreover, in the case of wheels with odd spoke patterns, it is sometimes not possible to make the hole for the valve in a position diametrically opposite the joint of the extruded rod, but only in an approximately opposite position since the diametrically opposite position is occupied by a spoke or by a group of spokes. The resultant of the centrifugal forces cannot, therefore, be cancelled out due to the aforementioned mass difference and/or due to the angle that the forces due to the two localized mass increases form between them.

It has also been attempted to solve the problem of balancing in such rims by sticking a plate at the valve hole. By providing an additional element, such a provision is, however, unsatisfactory both from the manufacture point of view and from the point of view of the end product, since, besides increasing the weight of the rim, the plate risks detaching with the use of the bicycle, is unaesthetic and not aerodynamic.

The technical problem at the basis of the present invention is to effectively reduce the dynamic imbalance of a bicycle wheel.

SUMMARY OF THE INVENTION

According to the invention, the masses of a set of spoke connections for connection of a hub and a rim of a spoked bicycle wheel are, as a whole, imbalanced with respect to the rotation axis of the wheel. Thus, the dynamic imbalance of the wheel due to localized mass increases at the valve and at a possible joint is reduced or eliminated.

BRIEF DESCRIPTION OF THE DRAWINGS

The invention shall be better described hereafter with reference to some embodiments and examples, based upon the attached drawings, wherein corresponding elements are designated by similar reference numerals. In the drawings:

FIG. 6 illustrates a spoke of increased mass according to the present invention, FIG. 7 illustrates an alternative spoke of increased mass according to the present invention, FIG. 14 illustrates an embodiment of a spoke of reduced mass.

DETAILED DESCRIPTION OF THE PREFERRED EMBODIMENTS

Introduction to the Embodiments

Figure 1:
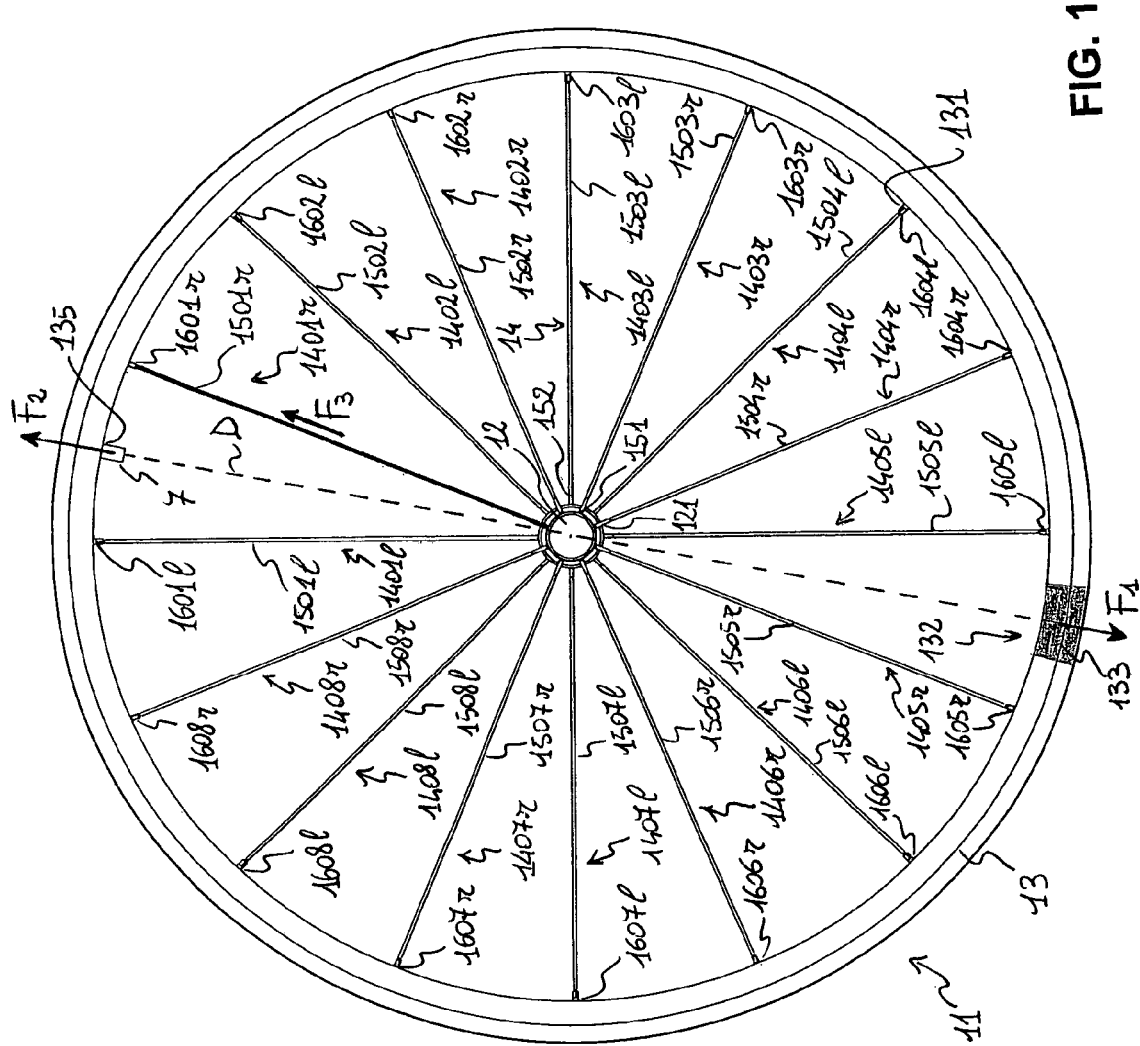
FIG. 1 illustrates a spoked bicycle wheel according to a first embodiment.

The invention, in a first aspect thereof, concerns a spoked bicycle wheel comprising a hub, a rim and a set of spoke connections connecting the hub and the rim, wherein the masses of the set of spoke connections as a whole are imbalanced with respect to the wheel's axis of rotation.

Thus, it is possible to at least partially compensate for localized mass increases of the wheel, in particular a joint and/or the valve for retaining the air of the pneumatic tire.

Preferably, the imbalance, with respect to the axis of rotation, of the set of spoke connections compensates for an imbalance due to at least one localized mass increase of the wheel, so that the wheel is perfectly dynamically balanced.

In particular, said set comprises at least one spoke connection of a different mass at least than the remaining spoke connections of a sub-set of spoke connections, regular with respect to the rotation axis.

In particularly simple and effective embodiments, there are just one or two spoke connections of different mass.

Typically, each spoke connection comprises a spoke and a removable connection element at a first end of said spoke for removable connection with the rim or with the hub.

In such a case, in first embodiments the spoke of at least one spoke connection has a different mass than the spokes of other spoke connections.

Advantageously, said at least one spoke of different mass has an intermediate portion having a different cross-sectional area than its end portions. In such a way, all of the end portions of the spokes can be identical and therefore it is not necessary to differentiate the spoke attachment seats provided in the rim and/or in the hub, as well as it is also possible to use any removable connection elements all equal to each other.

Furthermore, the intermediate portion can be flattened to obtain a more aerodynamic profile of the spoke.

The intermediate portion can be central or closer to an end portion of the spoke at the rim side. By arranging the intermediate portion closer to the rim side, the mass difference shall cause a greater centrifugal or centripetal force, easing the compensation or the partial reduction in imbalances of the wheel due to localized mass increases.

Alternatively or in addition to the spoke, the removable connection element of at least one spoke connection can have a different mass than the removable element of other spoke connections.

Preferably, the removable connection element of different mass is for connection with the rim. In such a way, the mass difference shall cause a greater centrifugal or centripetal force.

In particular, when each removable connection element comprises an internally threaded element coupled with an outer threading of an end of a spoke, it can be the internally threaded element of at least one spoke connection that has a different mass than the internally threaded element of other spoke connections.

Alternatively or in addition, when each removable connection element comprises an internally threaded element coupled with an outer threading of an end of a spoke and an abutment plate, the abutment plate of at least one spoke connection can have a different mass than the abutment plate of other spoke connections.

In a further alternative, the removable connection element of at least one spoke connection can comprise an additional abutment plate with respect to other spoke connections, which have just one or do not have any.

The different mass of the spoke connections can be obtained by using materials of different specific densities.

In particular, said materials of different specific densities can comprise aluminum on the one hand and steel or brass on the other hand.

According to some embodiments, the wheel comprises a first localized mass increase at a first position, and said set comprises at least one spoke connection of reduced mass arranged in the half of the rim centered about said first position.

In the above context, under reduced mass it is meant reduced with respect to a mass that would make said set balanced with respect to the rotation axis.

Said at least one spoke connection of reduced mass is preferably arranged adjacent the first position.

According to other embodiments, the wheel comprises a first localized mass increase at a first position and said set comprises at least one spoke connection of increased mass arranged in the half of the rim opposite the half of the rim centered about said first position.

In the above context, under increased mass it is meant increased with respect to a mass that would make said set balanced with respect to the rotation axis.

The at least one spoke connection of increased mass is preferably arranged substantially diametrically opposite said first position.

Advantageously, the above solutions also at least partially compensate for a second localized mass increase, less than the first localized mass increase.

This occurs, in particular, when said second localized mass increase is in an intraspoke zone substantially diametrically opposite the first localized mass increase and therefore the two localized mass increases partially compensate for each other.

However, it is possible to carry out an at least partial compensation of two discontinuities or localized mass increases separately.

Thus, when the wheel further comprises a second localized mass increase, less than said first localized mass increase, at a second position, in all of the aforementioned embodiments said set can further comprise at least one spoke connection of reduced mass arranged in the half of the rim centered about said second position, preferably arranged adjacent to said second position, or else said set can further comprise at least one spoke connection of increased mass arranged in the half of the rim opposite the half of the rim centered about said second position, preferably arranged substantially diametrically opposite said second position.

In other embodiments, the positions of the spoke connections of said set are irregularly arranged about the rotation axis of the wheel.

With the imbalance of such an irregularly arranged set of spoke connections, it is possible to partly counterbalance or preferably to compensate for the dynamic imbalance caused by the localized mass increase(s) of the wheel, even with spoke connections of a same mass, and one or more spoke connections may easily be added to an existing wheel to upgrade it to a dynamically balanced wheel.

In preferred embodiments, the set comprises a sub-set of spoke connections balanced with respect to the rotation axis and at least one additional spoke connection, that is/are used for compensation.

The balanced sub-set of spoke connections may comprise spoke connections of different length for attachment to either side of the hub and/or of the rim, and/or may comprise groups of closer spoke connections.

Especially when the additional spoke connection/s is/are not tensioned, the wheel may be optimized from the static point of view also.

Preferably, the additional spoke connection/s is/are equal to some or all of the spoke connections of the balanced sub-set. It is thus not necessary to provide for special additional spokes.

The additional spoke connection/s may also have a different mass than some or all of the spoke connections of the balanced sub-set, thus providing a further degree of freedom in balancing the localized mass increase/s of the wheel.

Additional spoke connection/s of a different mass may be obtained in any of the ways disclosed above.

In particular, at least part of the additional spoke connection/s may be made of a material with different specific density than some or all of the spoke connections of the balanced sub-set, e.g. of plastics.

In particularly simple and effective embodiments, there are just one or two additional spoke connections.

According to some of these embodiments, the wheel comprises a first localized mass increase at a first position, and said at least one additional spoke connection is/are arranged in the half of the rim opposite the half of the rim centered about said first position, preferably arranged substantially diametrically opposite said first position.

Advantageously, the above solutions also at least partially compensate for a second localized mass increase, less than the first localized mass increase.

This occurs, in particular, when said second localized mass increase is in an intraspoke zone substantially diametrically opposite the first localized mass increase and therefore the two localized mass increases partially compensate for each other.

However, it is possible to carry out an at least partial compensation of two discontinuities or localized mass increases separately.

Thus, when the wheel further comprises a second localized mass increase, less than said first localized mass increase, at a second position, said at least one additional spoke connection can be arranged in the half of the rim opposite the half of the rim centered about said first position, preferably arranged substantially diametrically opposite said first position.

In other embodiments, said set comprises spoke connections in a not uniform arrangement about the periphery of the wheel, without there being a sub-set of spoke connections balanced with respect to the rotation axis.

The set then comprises denser regions, i.e. with a greater number of spoke connections, and less dense regions, i.e. with a smaller number of spoke connections, the criteria for their arrangement with respect to the localized mass increase(s) of the wheel being analogous to the criteria outlined above for arranging spoke connection(s) of different mass in a sub-set of spoke connections regular with respect to the rotation axis of the wheel.

In a second aspect thereof, the invention concerns a set of spoke connections as outlined above.

In a third aspect thereof, the invention concerns a method of manufacturing a spoked bicycle wheel, comprising the step of providing a hub, a rim and a set of spoke connections for connection of the rim and the hub, comprising the step of arranging the spoke connections so that the masses of the set of spoke connections as a whole are imbalanced with respect to the rotation axis.

Preferably the arranging step comprises arranging the spoke connections so as to compensate for an imbalance due to at least one localized mass increase of the wheel, so that the wheel is perfectly dynamically balanced.

In a fourth aspect thereof, the invention concerns a spoke for a wheel as outlined above, having an intermediate portion of greater cross-sectional area than its end portions.

The intermediate portion can be flattened and can be central or closer to an end portion of the spoke at the rim side.

In a fifth aspect thereof, the invention concerns a method of manufacturing a spoke for a set of spoke connections as outlined above, comprising the steps of:

i) providing a metal cylindrical wire having a first diameter, ii) reducing the diameter of a predetermined length of wire to a second diameter along a first and second end portions of said predetermined length of wire, iii) cutting said predetermined length of said wire, iv) forming hub attachment means at said first end portion, v) forming rim attachment means along at least part of said second end portion.

Step iii) of cutting a predetermined length of said wire can precede or preferably follow step ii) of reducing the diameter of the wire.

It can be further included the step of:

vi) flattening the portion of wire between said first and said second end portions.

Alternatively or in addition, the method can further comprise the step of:

vii) bending said first end portion.

Typically step ii) is carried out through drawing or hammering.

In an embodiment, the first diameter is 2.3 millimeters and said second diameter is 2 millimeters.

Typically, the rim attachment means comprises an outer threading.

Typically, the hub attachment means comprises a head.

Typically, step iv) is carried out through upsetting.

Description of the Embodiments

With reference to FIG. 1, a view from the right hand side of a wheel 11 according to the invention is shown. The shown wheel 11, in particular a front wheel, has a flanged hub 12, a rim 13 and a set of spoke connections 14 between the hub 12 and the rim 13.

Figure 2:
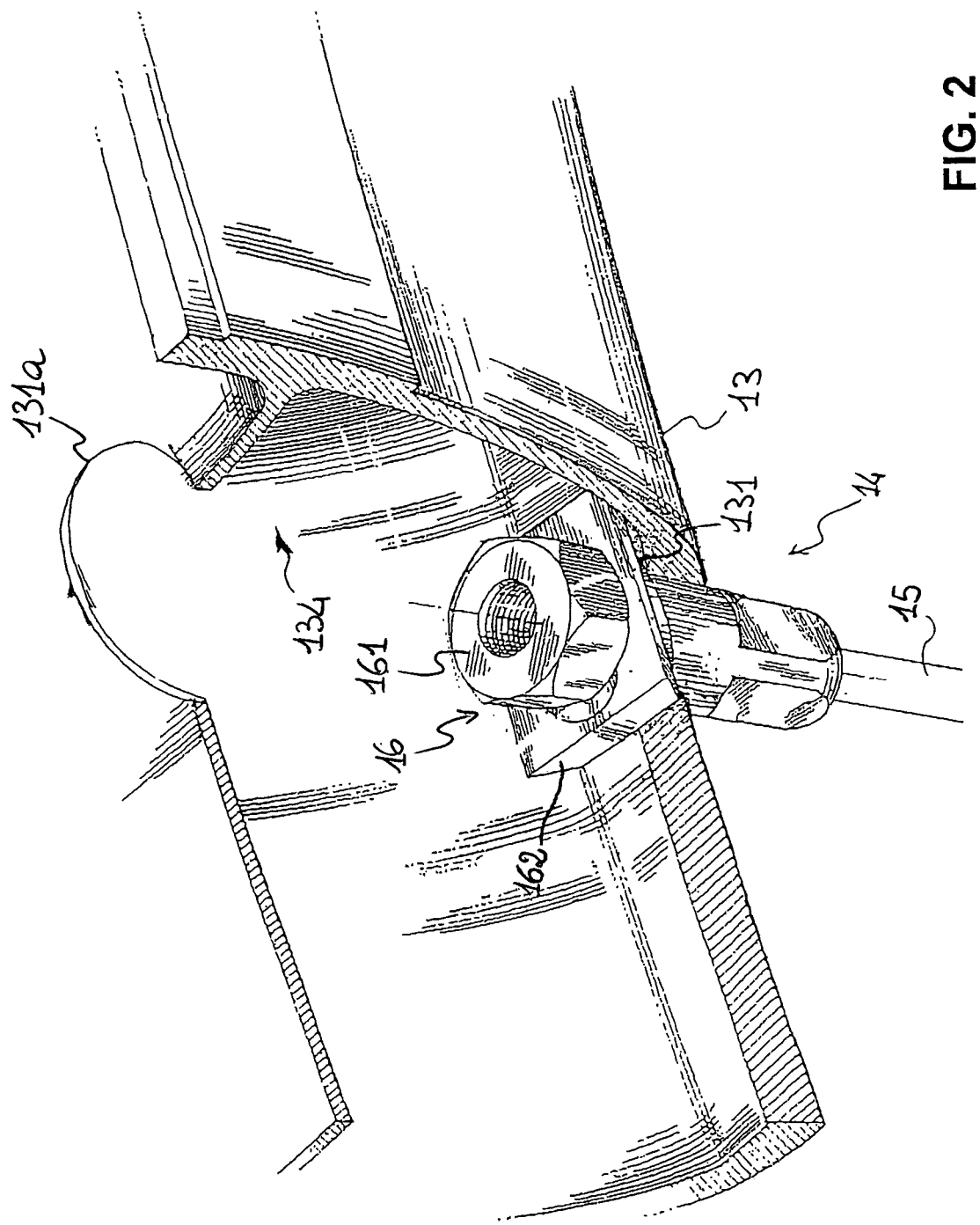
FIG. 2 is a partial perspective view of a portion of rim, with a spoke connection coupled.

Also with reference to FIG. 2, each spoke connection 14 comprises a spoke 15 and a removable connection element 16, which in turn comprises an internally threaded element 161 or nipple and an abutment plate 162, which however can be missing.

Each spoke 15 has a head 151 at a first end, bent at a bend 152, and an outer threading 153 at a second end, opposite the first end. Such elements of the spoke can be seen more clearly in FIGS. 6 and 7, although relative to a special spoke as described hereafter. The bend 152 can be absent for use with a non-flanged hub attachment, for example as illustrated in U.S. Pat. No. 6,783,192, incorporated herein by reference.

The head 151 of each spoke is housed in a corresponding seat 121 of the hub 12. The outer threading 153 of the spoke 15 engages in the inner threading of the internally threaded element 161, which abuts against the rim 13 at a respective seat 131, with the interposition of the plate 162. An opening 131a in the upper bridge of the rim 13, for accessing the internally threaded element 161 with a tool, is also shown.

It is alternatively possible to use any alternative configuration of the spoke connections 14, as is well known in the field, for example in which the internally threaded element engages with the hub 12 and the head 151 engages with the rim 13.

The spoke pattern of the wheel 11 is of the type with spoke connections 14 distributed equally spaced apart along the circumference of the rim 13.

The spoke pattern of the wheel 11 has an even number of spoke connections 14, namely sixteen spoke connections, eight spoke connections 1401r-1408r on the right hand side of the hub 12 and eight spoke connections 1401l-1408l on the left hand side of the hub 12.

Figure 3:
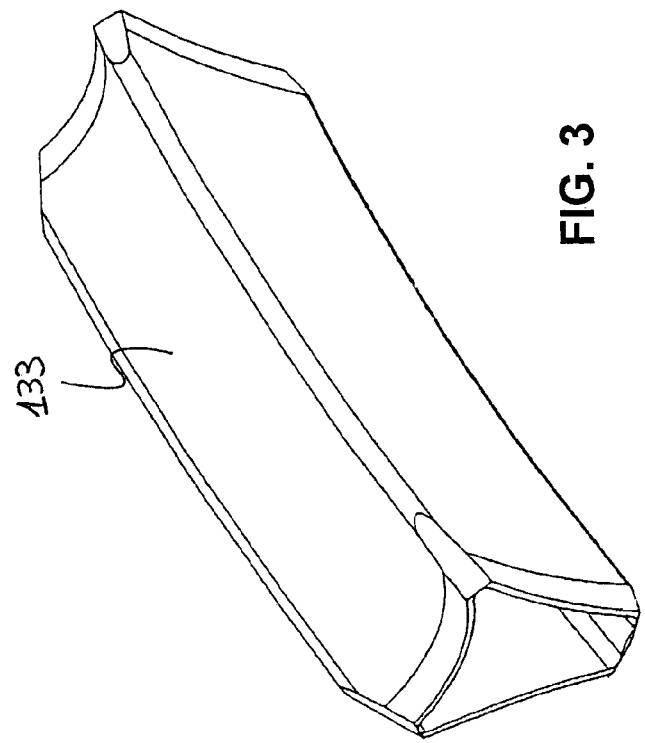
FIG. 3 is a perspective view of a sleeve for jointing the rim.
Figure 4:
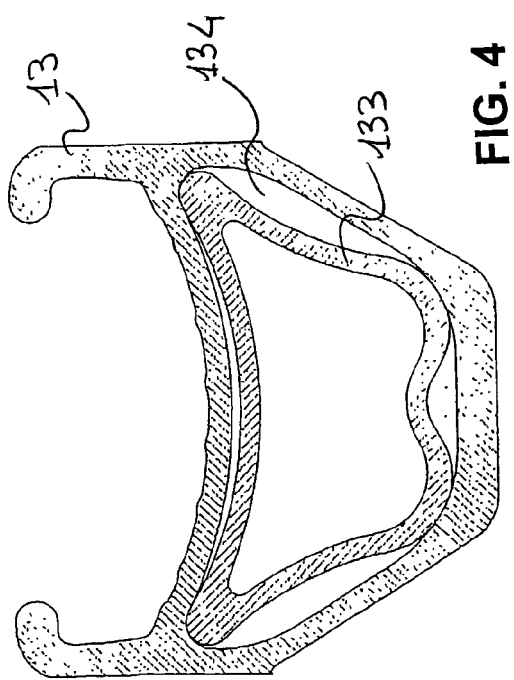
FIG. 4 is a cross-sectional view of the sleeve of FIG. 3 inserted in the rim.

The rim 13 is of the metal type, made by extrusion of a rod having a suitable cross-section, its calendaring and jointing of the ends at a jointing zone 132. The jointing in the zone 132 is carried out by a sleeve 133, illustrated in FIG. 3, interference fitted in the inner chamber 134 of the rim 13. As illustrated in FIG. 4, the sleeve is inserted for a certain length from both ends of the extruded and calendared rod. An adhesive is possibly applied to the sleeve 133 to increase the retaining force.

Figure 5:
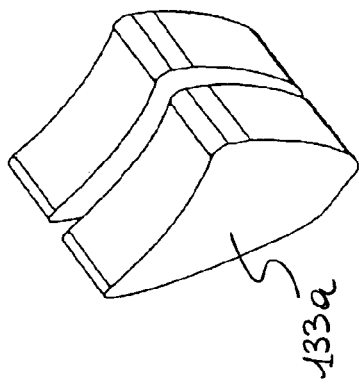
FIG. 5 is a perspective view of a pair of inserts for jointing the rim.

As an alternative to the sleeve 133, the jointing in the zone 132 can take place through a plurality of pins inserted in the wall of the ends of the rim or by butt-welding the ends of the extruded and calendared rod. In FIG. 5 a pair of solid metal inserts 133a are illustrated, which are inserted into the inner chamber 134 of the rim 13 to allow the ends to be gripped with suitable pincers during welding without the risk of deforming the rim 13.

The sleeve 133, including the optional adhesive, (or the other equivalent elements in the jointing zone 132) has a mass m1, which represents a mass discontinuity of the wheel 11, in particular a localized mass increase. In a position on the rim 13 diametrically opposite the sleeve 133, a housing hole 135 is made for a valve 7 for retaining the air in a pneumatic tire (not shown) externally associated with the rim 13. The valve 7 is typically made of brass and represents another mass discontinuity of the wheel 11, in particular a localized mass increase. The localized mass increase due to the presence of the valve 7 minus the local reduction in mass due to the presence of the hole 135 for the valve 7 itself shall be indicated for the sake of brevity in the rest of the description as mass m2 of the valve 7. As explained above, the mass m1 is usually different than the mass m2, so that the wheel 1 is dynamically imbalanced, although the jointing zone 132 and the hole 135 for the valve 7 are diametrically opposite. In most cases, the mass m1 of the joint is greater than the mass m2 of the valve and reference shall be made to this assumption in the present embodiment and in the subsequent embodiments.

To reduce or even cancel out the imbalance of the wheel 11, according to the present invention, while the spoke connections 1402r-1408r and 1401l-1408l have a mass ms, the spoke connection 1401r adjacent the hole 135 for the valve 7 has a greater mass, ms+m3. For merely illustrative purposes, such a spoke connection 1401r of increased mass is illustrated darkened.

More specifically, the mass increase m3 of the spoke connection 1401r can be obtained through an increase in the mass of the spoke 1501r with respect to the remaining spokes, whereas the removable connection elements 16 of the wheel 11 are identical to each other.

According to an aspect of the invention, the spoke 1501r, better represented in FIG. 6, has an intermediate portion 154 of greater cross-section with respect to the cross-sections of the ends bearing the head 151 and the outer threading 153, whereas the remaining spokes are substantially cylindrical for their entire length.

The ends bearing the head 151 and the outer threading 153 of all sixteen spokes 15 of the spoke connections 14 are advantageously identical, so that the set of spoke connections 14 can be used with a conventional rim 13, wherein the spoke attachment seats 131 are all identical, and analogously can be used for a conventional hub 12.

A process for making the spoke 1501r of increased mass according to the present invention comprises the following steps:

i) providing a cylindrical metal wire with a first diameter d1, ii) reducing the diameter of a predetermined length of wire to a second diameter d2 for a certain length at first and second ends of the predetermined length of wire to obtain the intermediate portion 154, for example through drawing or hammering, iii) cutting the predetermined length of said wire, iv) forming the head 151 at the first end of the length of wire, for the attachment to the hub 12 at the seat 121, for example by upsetting, v) forming the outer threading 153 at the second end of the length of wire, for attachment to the rim 13 through screwing into the internally threaded element 161 of the removable connection element or nipple 16, and vi) bending the length of wire at the bend 152.

The bending step can be left out in the case of a hub with non-flanged attachment, for example as illustrated in the cited document U.S. Pat. No. 6,783,192. Such a spoke 1501r' of increased mass is represented in FIG. 7.

Step iii) of cutting a predetermined length of wire can precede or preferably follow step ii) of reducing the diameter of the wire.

A further optional step of the method outlined above can consist of flattening the intermediate portion of diameter d1 to obtain a more aerodynamic profile of the spoke 1501r.

The resultant of the centrifugal forces acting in the wheel 11 under dynamic conditions can be expressed by the following formula (1) wherein, just like in the subsequent formulae, vector values are indicated in bold type:

$$F=F1+F2+F3 \qquad (1)$$

wherein the modules of the component forces are expressed by the following formulae:

$$F1=m1*\omega^2*R1 \qquad (2)$$

$$F2=m2*\omega^2*R2 \qquad (3)$$

$$F3=m3*\omega^2*R3 \qquad (4)$$

wherein ω stands for the angular speed of the wheel 11; R1, R2 and R3 stand for the distances from the center of the wheel 11 to the centers of mass of the mass m1 of the joint 132, of the mass m2 of the valve 7, and of the additional mass m3 of the increased spoke 1501r, respectively.

It should be noted that R1, R2 and R3 are substantially equal to each other and substantially equal to the geometric radius R of the wheel 11, whereas R3, equal to half the length of the spoke 1501r added to the radius of the hub 2, is approximately half the geometric radius R of the wheel 11.

Moreover, it should be noted that the first component force F1 in formula (1), i.e. the effect of the joint in the zone 132, is parallel and in the opposite direction to the second component force F2, i.e. the effect of the valve 7, and is substantially opposite the third component force F3, i.e. the effect of the increase in the spoke 1501r with respect to the remaining spokes.

Even with very low values of the additional mass m3 of the increased spoke 1501r, for example 1 or 2 grams, the value of the resultant of the forces F gets close to zero and the dynamic imbalance of the wheel 11 reduces with respect to a wheel in which all sixteen spoke connections are identical to each other or in any case are such as to form a balanced set.

On the other hand, the set of spoke connections 14 is imbalanced, but once it is connected in the wheel between the hub 12 and the rim 13, and once the valve 7 has been fitted, the wheel 11 is less imbalanced, if not perfectly balanced.

Although in FIG. 6 the intermediate portion 154 is a central portion of the spoke 1501r, such an intermediate portion 154 can alternatively be decentered towards the end bearing the outer threading 153. In such a case, it should be understood that the center of mass of the additional mass m3 is moved further towards the rim 13 and therefore the distance R3 in the above formula (4) shall be greater, so that a smaller additional mass m3 shall be sufficient to reduce the imbalance of the wheel 11.

The component forces in formula (1) due to the zone of the joint 132 (F1) and to the valve 7 (F2) act along a diameter D extending between them in opposite directions.

The force F3 due to the increased mass of the spoke 1501r acts along a direction forming an angle of one thirty-second of a revolution or 11.25° with such a diameter D and therefore, along such a diameter D, it is necessary to consider a factor $\cos(11.25°)=0.98$.

In the above, the fact that in reality the spokes 15 are not in the median plane of the wheel 11 (plane of FIG. 1) was neglected, they actually extending between one and the other end of the hub 12 to the seats 131 of the rim, which are also not precisely in the median plane of the wheel 11. Strictly speaking, therefore, the centrifugal force F3 lies in a plane parallel to the aforementioned median plane without, however, this introducing significant effects on the dynamic behavior of the wheel.

EXAMPLE 1

Let us consider a brass valve 7, of standard size for road bicycles, having a mass of 6 grams and a joint with a sleeve 133 having a mass of 8.5 grams.

It is worth highlighting that the values of the masses m1 and m2 of the valve 7 and of the sleeve 133 are predetermined.

Considering such values in formulae (1)-(4) and also considering R1=R2=R and R3=R/2, one obtains that with an additional mass m3 of the spoke 1501r of increased mass of a little more than 5 grams the wheel 11 is substantially balanced.

Let us consider steel spokes 15 that are 286 millimeters long and cylindrical with a diameter of 2 millimeters. The mass of each spoke is 7.2 grams. By making the spoke of increased mass 1501r of steel, with the end portions having a diameter of 2 millimeters and an intermediate portion 154 about 240 millimeters long with a diameter of 2.75 millimeters, a mass of the spoke 1501r of 12.5 grams and therefore an additional mass of 5.3 grams is obtained, suitable for the substantially perfect balancing of the wheel 11.

It should be understood that in the wheel 11 described above, the spoke connections 1401l-1408l at the left hand side of the hub 12 could have a different mass ms' than the mass ms, for example because they form a different angle with the median plane of the wheel 11 with respect to the spoke connections of the right hand side. Such a mass ms' could even be equal to the mass ms+m3 of the spoke connection 1401r, without changing anything stated above regarding the resultant F of the forces. In the same way, also within the spoke connections 1402r-1408r of the right hand side of the hub 12, there could be regular sub-sets of spoke connections (for example, four spoke connections spaced apart by 90°) of a different mass than the mass ms.

Figure 8:
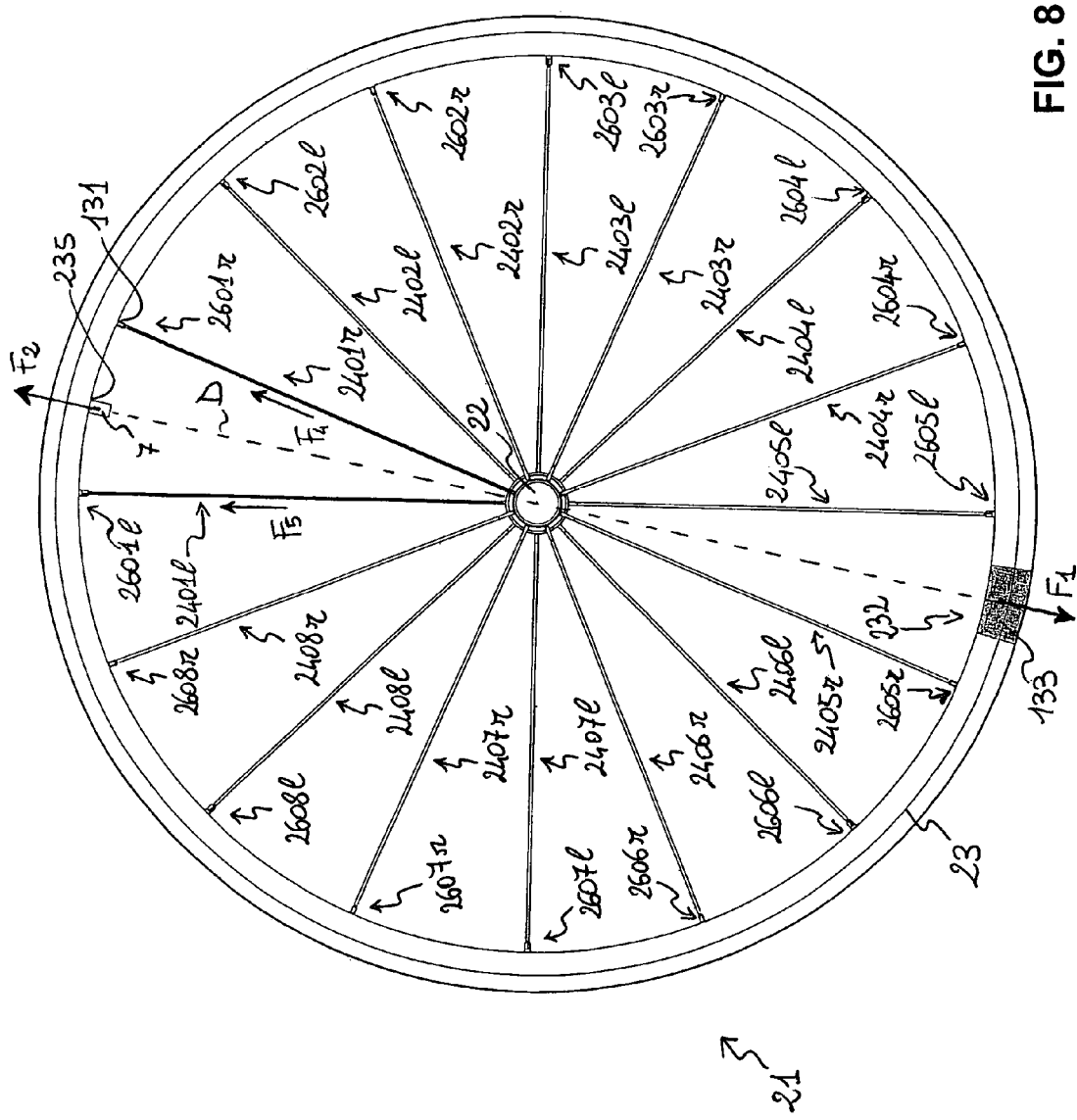
FIG. 8 illustrates a spoked bicycle wheel according to a second embodiment.

A wheel 21 according to a second embodiment of the invention, represented in FIG. 8, differs from the wheel 11 of FIG. 1 in that both of the spoke connections 2401*r* and 2401*l* adjacent to the hole 235 for the valve 7 are of increased mass with respect to the remaining spoke connections 2402*r*-2408*r* and 2402*l*-2408*l*. Also in FIG. 8, the connections of increased mass are shown darkened merely for illustrative purposes.

The resultant of the centrifugal forces acting in the wheel 21 under dynamic conditions can be expressed by the following formula (5):

$$F = F1 + F2 + F4 + F5 \quad (5)$$

Wherein $$F4 = m4 * \omega^2 * R4 \quad (6)$$

$$F5 = m5 * \omega^2 * R5 \quad (7)$$

wherein R4 and R5 stand for the distances from the center of the wheel 21 to the centers of mass of the additional mass m4 of the spoke connection of increased mass 2401*r* and of the additional mass m5 of the spoke connection of increased mass 2401*l*, respectively, and the remaining symbols are as described above with reference to the first embodiment.

In case the increase of the spoke connections 2401*r* and 2401*l* is obtained through two spokes like the spoke shown in FIG. 6 or in FIG. 7, R4 and R5 are substantially equal to half the geometric radius R of the wheel 21 (in fact, equal to half the length of the spoke 2401*r* and 2401*l* added to the radius of the hub 22). It should also be noted that the forces F4 and F5 each form an angle of 11.25° with the diameter D extending between the zone of the joint 32 and the valve 7, the diameter along which the forces F1 and F2 act, in opposite directions. The resultant of the two forces F4 and F5 therefore acts along the diameter D. The forces F4 and F5 also strictly speaking lie in planes parallel to the median plane of the wheel 21, but on opposite sides, and their effect is totally negligible on the dynamic behavior of the wheel 21.

Also in this case, even with very low values of the additional mass m4 and m5, for example 1 or 2 grams, the dynamic imbalance of the wheel 21 is reduced with respect to a wheel in which all of the sixteen spoke connections are identical to each other or in any case such as to form a balanced set.

The imbalance resulting from the presence of the sleeve 133 or other type of joint and of the valve 7 can in such a case be totally cancelled out with a suitable selection of values m4 and m5, like in the following example, obtaining perfect balance. The value of the resultant of the forces F is, indeed, equal to zero.

EXAMPLE 2

Under the conditions illustrated above and with the values provided in example 1 for the masses m1 and m2, one obtains that with additional masses m4 and m5 of the spokes of the spoke connections 2401*r* and 2401*l* of 2.5 grams each, the wheel 21 is perfectly balanced.

By making the spokes of the spoke connections of increased mass 2401*r* and 2401*l* of steel, with the end portions having a diameter of 2 millimeters and an about 265 millimeters long intermediate portion 154 with a diameter of 2.34 millimeters, a weight of the spokes of the spoke connections 2401*r* and 2401*l* of 9.7 grams and therefore an additional mass of 2.5 grams with respect to the spokes of the remaining spoke connections 2402*r*-2408*r* and 2402*l*-2408*l*, of identical mass according to this example, is obtained, suitable for the perfect balancing of the wheel 21.

Also in the wheel 21 described above, the spoke connections 2402*l*-2408*l* on the left hand side of the hub 12 could have a different mass ms' than the mass ms of the spoke connections 2402*r*-2408*r*, without changing anything of what stated regarding the resultant F of the forces, of course provided that m5 in formula (7) represents the difference in mass of the spoke connection 2401*l* with respect to the spoke connections 2402*l*-2408*l*. Furthermore, there can be, on one and/or the other side of the hub 22, sub-sets of regular spoke connections (for example, four spoke connections spaced apart by 90°) of different mass than the mass ms.

Figure 9:
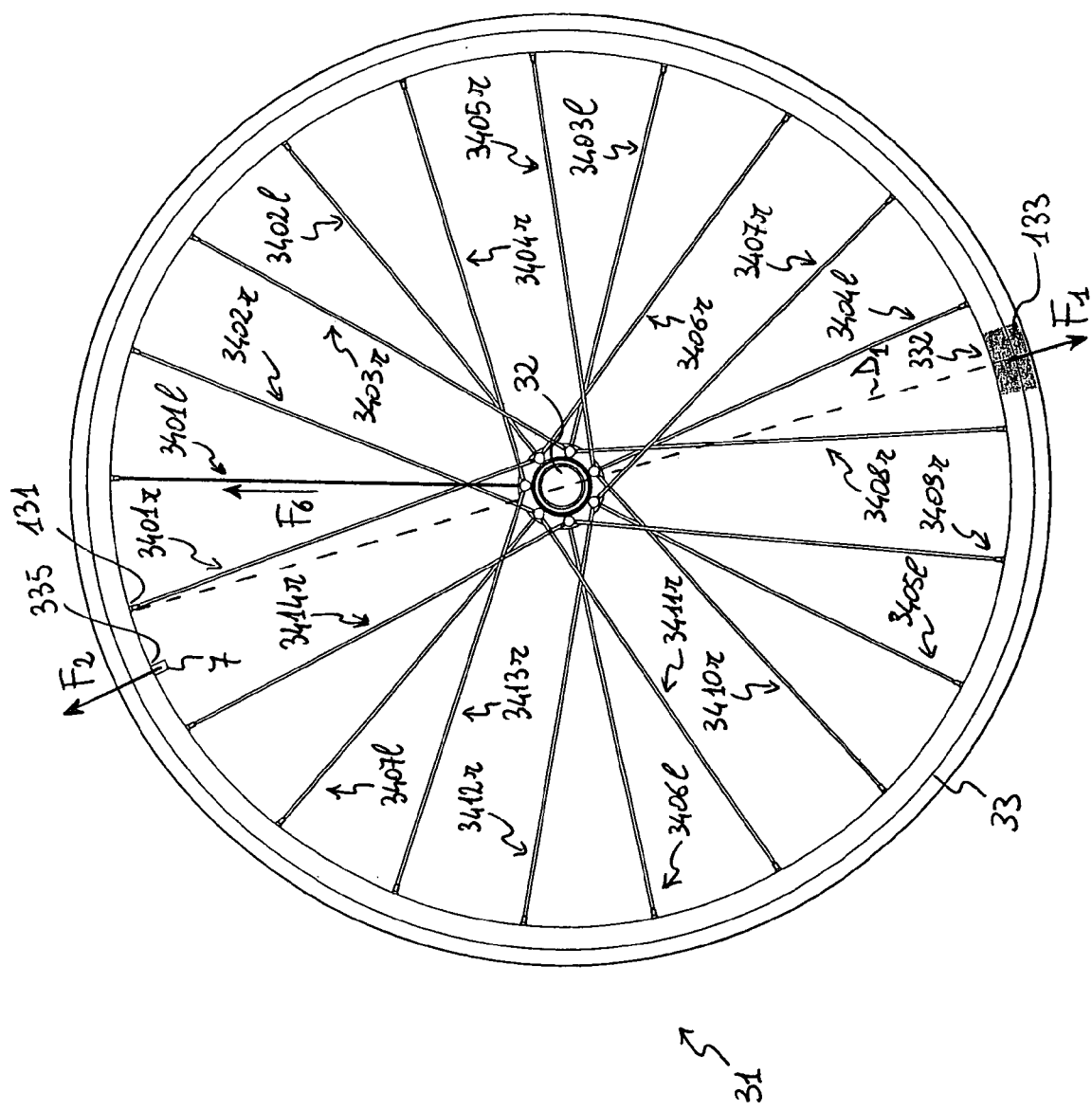
FIG. 9 illustrates a spoked bicycle wheel according to a third embodiment.

A wheel 31 according to a third embodiment of the invention, in particular a rear wheel, is represented in FIG. 9.

The spoke pattern of the wheel 31 has the spoke connections distributed equally spaced apart along the circumference of the rim 33, even if they are crossed in triplets close to the hub 32.

The spoke pattern of the wheel 31 has an odd number of spoke connections namely, twenty-one spoke connections, fourteen spoke connections 3401*r*-3414*r* on the right hand side of the hub 32 and seven spoke connections 3401*l*-3407*l* on the left hand side of the hub 32.

The hole 335 for the valve 7 is not diametrically opposite the zone 332 of the joint, a position where there is one of the seats 131 for a spoke connection 3401*r*. The hole 335 for the valve 7 is therefore at an angle of about 8.5° (one forty-second of a revolution) with respect to a diameter D1 passing through the zone 332 of the joint.

According to the invention, to reduce the dynamic imbalance of the wheel 31 resulting from the localized masses m1 of the joint 332 and m2 of the valve 7, it is provided to use a spoke connection of increased mass 3401*l*, darkened in FIG. 9 merely for illustrative purposes.

The spoke connection of increased mass 3401*l* is precisely the one adjacent the spoke connection 3401*r* diametrically opposite the zone of the joint 332, on the opposite side with respect to the valve 7, so that the centrifugal force F6 due to its additional mass m6 with respect to the remaining spoke connections, or at least with respect to the remaining spoke connections of a regular sub-set of connections to which it belongs, like for example the sub-set of spoke connections 3401*r*-3414*r*, has a component along the diameter D1 passing through the zone of the joint 332 and a component suitable for partially compensating for the component perpendicular to the direction D1 of the centrifugal force due to the valve 7.

Also in the case of the wheel 31, it is possible to reduce the dynamic imbalance with respect to a wheel in which all of the twenty-one spoke connections are identical to each other or in any case are such as to form a balanced set, even with very low values, for example 1 or 2 grams, of the additional mass of the spoke connection 3401*l* and, with suitably selected values of such an additional mass, to substantially eliminate such an imbalance.

Figure 10:
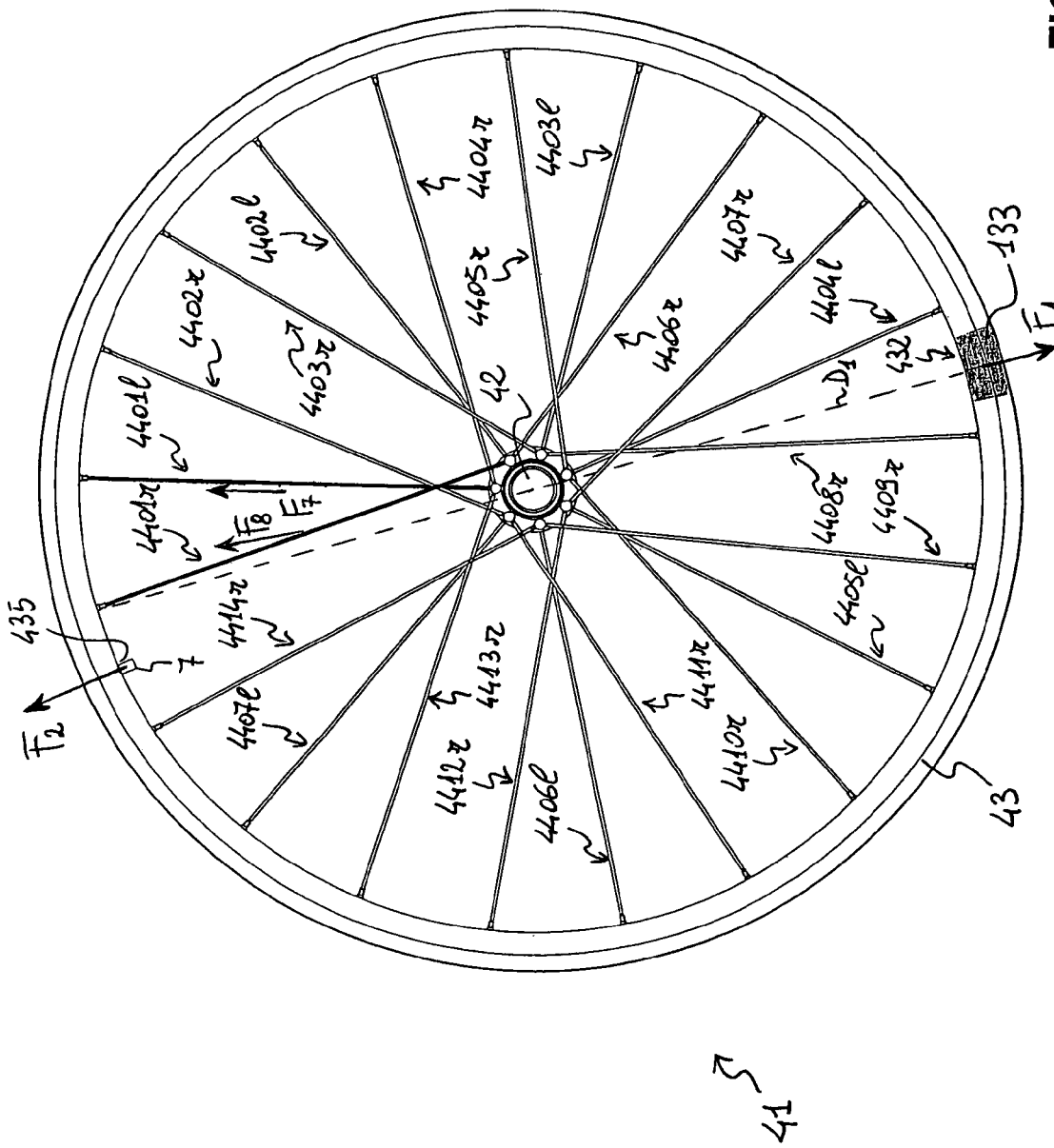
FIG. 10 illustrates a spoked bicycle wheel according to a fourth embodiment.

The wheel 41 according to a fourth embodiment of the invention, represented in FIG. 10, differs from the wheel 31 in that there are two spoke connections of increased mass, the spoke connection 4401*r* diametrically opposite the zone of the joint 432 and the spoke connection 4401*l* adjacent it on the opposite side with respect to the valve 7, shown darkened merely for illustrative purposes.

The mass increase of each of the spoke connections of increased mass 4401*r* and 4401*l* shall be selected of a suitable value, not necessarily equal to each other, with reference to the masses of the localized mass increases represented by the valve 7 and by the jointing zone 432, and also with reference to the masses of the remaining spoke connections of the set, which could all be the same or even of different values, for example different from one side of the hub 42 to the other.

Also in the case of the wheel 41, it is possible to reduce the dynamic imbalance with respect to a wheel in which all of the twenty-one spoke connections are identical to each other, or in any case are such as to form a balanced set, even with very low values, for example 1 or 2 grams, of the additional masses of the spoke connections 4401r and 4401l and, with suitably selected values of such additional masses, to substantially eliminate such an imbalance.

It should be noted that like the force F7, which is the effect of the additional mass m7 of the spoke connection 4401l with respect to the remaining spoke connections, also the force F8, which is the effect of the additional mass m8 of the spoke connection 4401r, acts in the radial direction. The various centrifugal forces F1, F2, F7, F8 thus act along four different directions.

Figure 11:
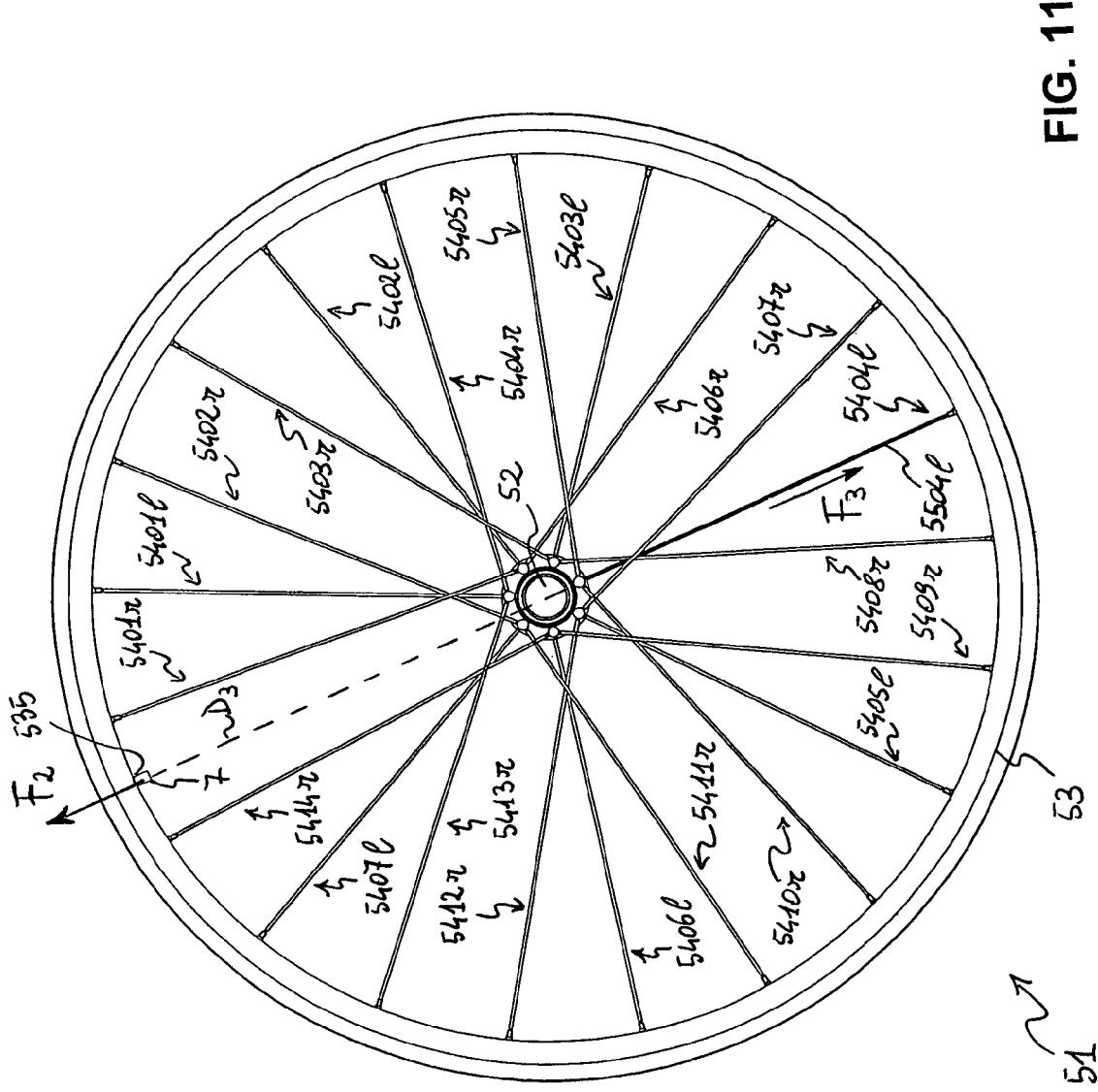
FIG. 11 illustrates a spoked bicycle wheel according to a fifth embodiment.

FIG. 11 represents a wheel 51, in particular a rear wheel, according to a fifth embodiment of the invention.

The spoke pattern of the wheel 51 is identical to the one described above with reference to the wheel 31 of FIG. 9, having an odd number of spoke arrangements, namely twenty-one spoke connections in crossed triplets.

In the wheel 51, the rim 53 is however made of composite material, made by molding and reticulation or curing of a fibrous material, for example carbon fiber, in a matrix of polymeric material. The details on the manufacture of the rim 53 can be found for example in EP 1 231 077, incorporated herein by reference. The rim 53 is in a single piece, and therefore does not comprise a joint.

Also in the case of the rim 53, there is nevertheless a localized mass discontinuity or increase, represented by the valve 7. As explained above, in the zone of the hole 535 for the valve 7 the thickness of the wall of the rim can be greater than in the rest of the rim 43. The additional mass due to the valve 7 and possibly to the greater thickness, minus the material removed from the hole 535 for the valve 7, is dynamically compensated for, according to the invention, through a spoke connection of increased mass 5404l, in the position diametrically opposite the valve 7. Also the connection 5404l is shown darkened merely for illustrative purposes.

The resultant of the centrifugal forces acting in the wheel 51 under dynamic conditions can be expressed by the following formula (8):

$$F = F2 + F3 \quad (8)$$

wherein the symbols are as described above with reference to the first embodiment. In particular, the mass increase m3 of the spoke connection of increased mass 5404l is meant as referred to the masses of at least the remaining spoke connections of the set that form a regular and balanced sub-set with it, like for example the spoke connections 5401l-5403l and 5405l-5407l.

It should be noted that the force F2, i.e. the effect of the localized mass increase resulting from the valve 7, is parallel and opposite the force F3, i.e. the effect of the additional mass of the connection 5404l.

Also in the case of the wheel 51, it is possible to reduce the dynamic imbalance with respect to a wheel in which all of the twenty-one spoke connections are identical to each other, or in any case are such as to form a balanced set, even with very low values, for example 1 or 2 grams, of the additional mass of the spoke connection 5404l and, with a suitably selected value of such an additional mass, to substantially eliminate such an imbalance, as illustrated by the following example.

EXAMPLE 3

Let us consider a brass valve 7, of standard size for road bicycles, with a mass of 6 grams, and let us neglect the effects of the hole 535 for the valve 7 and of the increase in thickness about such a hole.

The force F2, of absolute value $m2 * \omega^2 * R2$, shall be compensated by a spoke connection 5404l having an increased mass of about 12 grams with respect to the remaining spoke connections 5401l-5403l, 505l-5407l, irrespective of the mass of the spoke connections 5401r-5414r.

By making the spoke of increased mass 5504l of steel, with the end portions having a diameter of 2 millimeters and an about 240 millimeters long intermediate portion 154 with a diameter of 3.4 millimeters, a mass of the increased spoke 5504l of 18.7 grams and therefore an additional mass of 12 grams is obtained, suitable for the substantially perfect balancing of the wheel 51.

Figure 12:
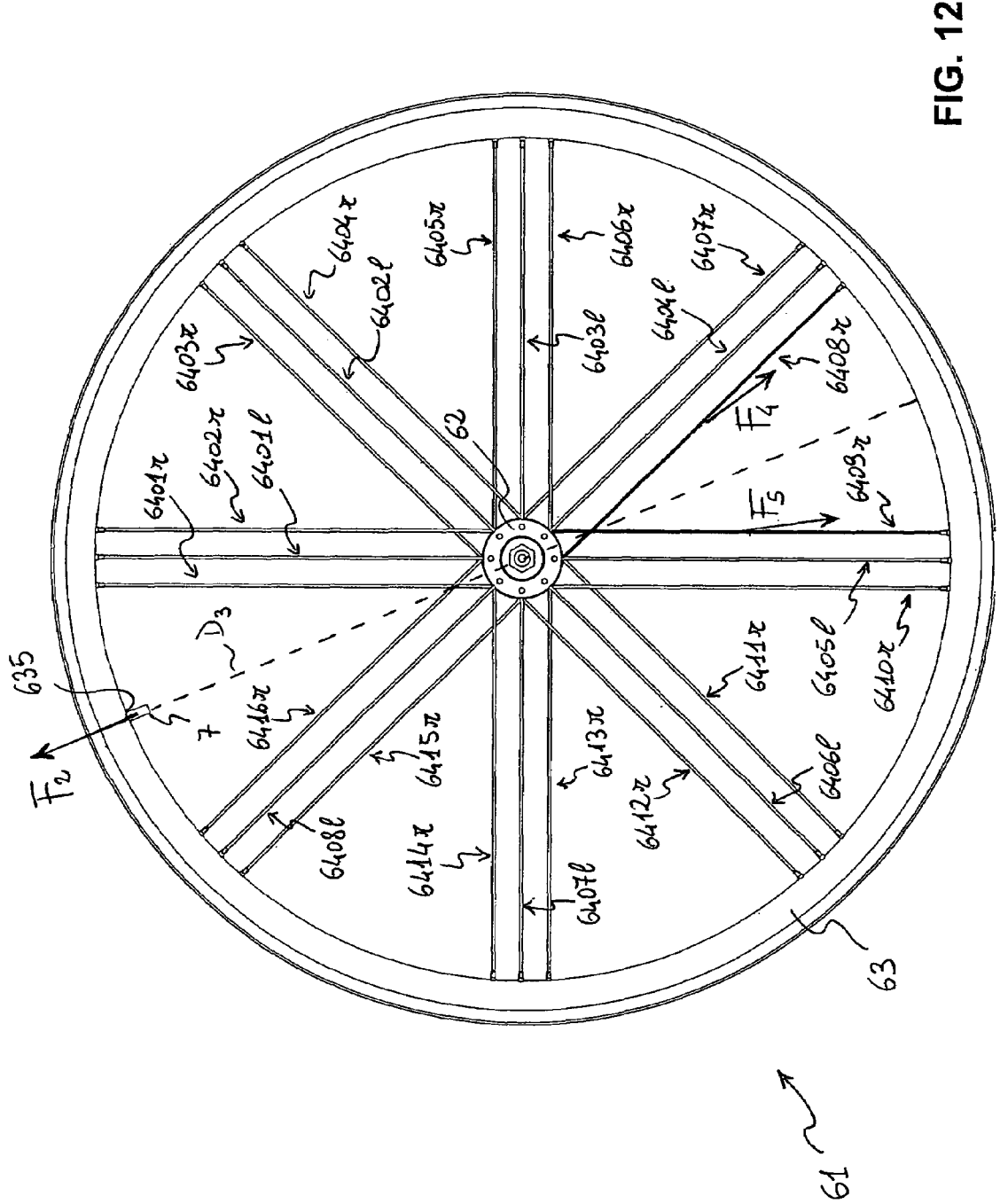
FIG. 12 illustrates a spoked bicycle wheel according to a sixth embodiment.

FIG. 12 represents a wheel 61, in particular a rear wheel, according to a sixth embodiment of the invention.

The spoke pattern of the wheel 61 comprises twenty-four spoke connections 6401l-6408l, 6401r-6416r grouped together in eight triplets.

Also in the wheel 61, the rim 63 is made of composite material. Therefore, there are no joints and the localized mass increase at the valve 7 would cause a dynamic imbalance.

Such an imbalance is reduced or eliminated, according to the invention, through two spoke connections of increased mass 6408r and 6409r, in the two positions immediately adjacent the position diametrically opposite the valve 7, shown darkened merely for illustrative purposes.

The resultant of the centrifugal forces acting in the wheel 61 under dynamic conditions can be expressed by the following formula (9):

$$F = F2 + F4 + F5 \quad (9)$$

where the symbols are as described above with reference to the first and second embodiments.

It should be noted that the sum of the forces F4 and F5, i.e. the effects of the additional masses of the spoke connections of increased mass 6408r and 6409r, is parallel to and opposite the force F2, i.e. the effect of the localized mass increase due to the valve 7.

To reduce the dynamic imbalance of the wheel 61 a value of only 1 or 2 grams of the additional masses of the spoke connections of increased mass 6408r and 6409r is therefore sufficient.

Advantageously, the additional masses m4 and m5 shall be selected equal to each other.

In all of the above embodiments, it is of course possible, in the spoke connections involved on each occasion, to replace a spoke of the type illustrated in FIGS. 6 and 7 with a spoke that is cylindrical along its entire length and with a greater diameter than the remaining spokes. Such a spoke can, of course, be manufactured with a simpler process than the one outlined above, however it is necessary to differentiate the spoke attachment seats in the rim and the removable connection elements.

Figure 13:
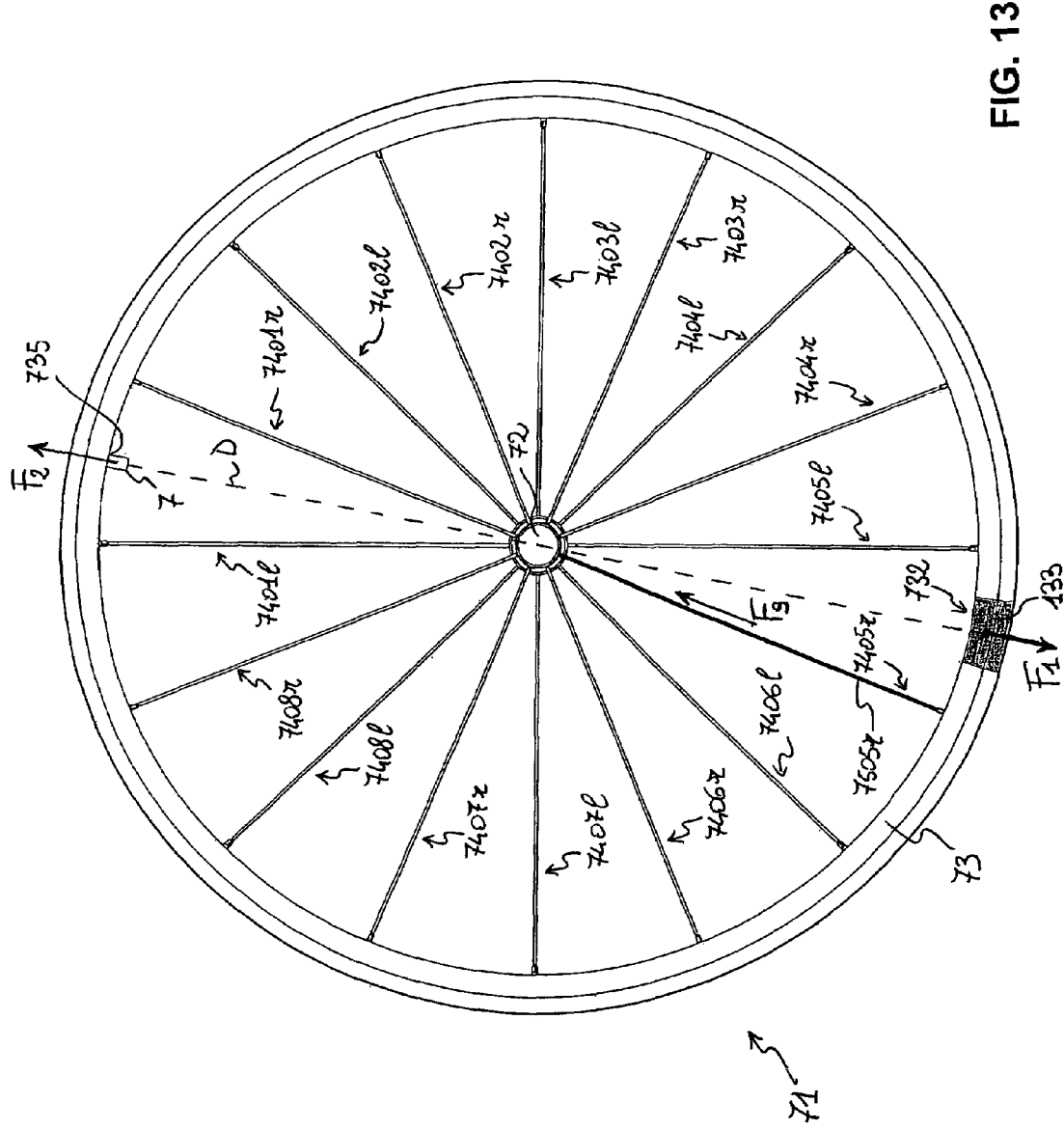
FIG. 13 illustrates a spoked bicycle wheel according to a seventh embodiment.

FIG. 13 represents a wheel 71 according to a seventh embodiment of the invention, of the same type as the one illustrated in FIG. 1.

According to FIG. 13, the dynamic imbalance resulting from the localized mass increases in the zone 732 of the joint and at the valve 7 is compensated through a spoke connection 7405r, arranged adjacent the zone 732 of the joint, of reduced mass ms-m9 with respect to the remaining spoke connections 7401r-7404r, 7406r-7408r, 7401l-7408l, of mass ms. The connection of reduced mass is shown darkened merely for illustrative purposes. Also in this case, sub-sets of spoke connections, for example the connections 7401*l*-7408*l*, could have a different mass ms' from the mass ms, and even equal to the reduced mass ms-m9.

The resultant of the forces acting in the wheel 71 under dynamic conditions is expressed by the formula (10):

$$F=F1+F2+F9 \qquad (10)$$

wherein the force F9, which is the effect of the reduced mass of the spoke connection 7405*r*, is directed radially inwards and is of module $m9*\omega^2*R9$, and the remaining symbols are as described above with reference to the first embodiment.

Also in the case of the wheel 71, it is possible to reduce the dynamic imbalance with respect to a wheel in which all of the sixteen spoke connections are identical to each other, or in any case are such as to form a balanced set, even with very low values, for example 1 or 2 grams, of reduction in mass in the spoke connection 7405*r*.

A reduction in mass of the spoke connection 7405*r* can be provided in various ways, first of which is to make all of the spokes cylindrical, but with different diameters, like in the following example.

EXAMPLE 4

Let us consider a steel cylindrical spoke 7505*r* with a diameter of 2 millimeters, the spokes of the remaining spoke connections 7401*r*-7404*r*, 7406*r*-7408*r*, 7401*l*-7408*l* on the other hand being cylindrical and made of steel with a diameter of 2.3 millimeters.

Considering a length of the spokes of 286 millimeters, whereas the spoke of reduced mass 7505*r* has a weight of 7.2 grams, the remaining spokes have a weight of 9.2 grams. Also considering that the distance R9 is again substantially equal to half the geometric radius R of the wheel (in fact, equal to half the length of the spoke 7505*r* added to the radius of the hub 72), the reduction in mass of 2 grams reduces the dynamic imbalance of the wheel 71.

It should be noted that also steel spokes with a diameter of 2.3 millimeters are commonly used in the field, for low range wheels or on mountain bikes where economic considerations prevail over the need to keep the weight of the wheel low.

To avoid the need to make spoke attachment seats 131 in the rim 73 with two sizes, the spoke of the spoke connection 7405*r* could have end portions with a diameter equal to the remaining spokes, for example 2.3 millimeters and an intermediate portion with a reduced diameter, for example 2 millimeters. A spoke having an intermediate portion 155 with reduced diameter is illustrated in FIG. 14.

Although the intermediate portion 155 with a reduced diameter of the spoke illustrated in FIG. 14 is centered, it could also be decentered towards the rim attachment side, to increase the distance R9 from the center of mass of the mass reduction m9. Moreover, the intermediate portion 155 with reduced diameter can be flattened to make the spoke more aerodynamic.

Figure 15:
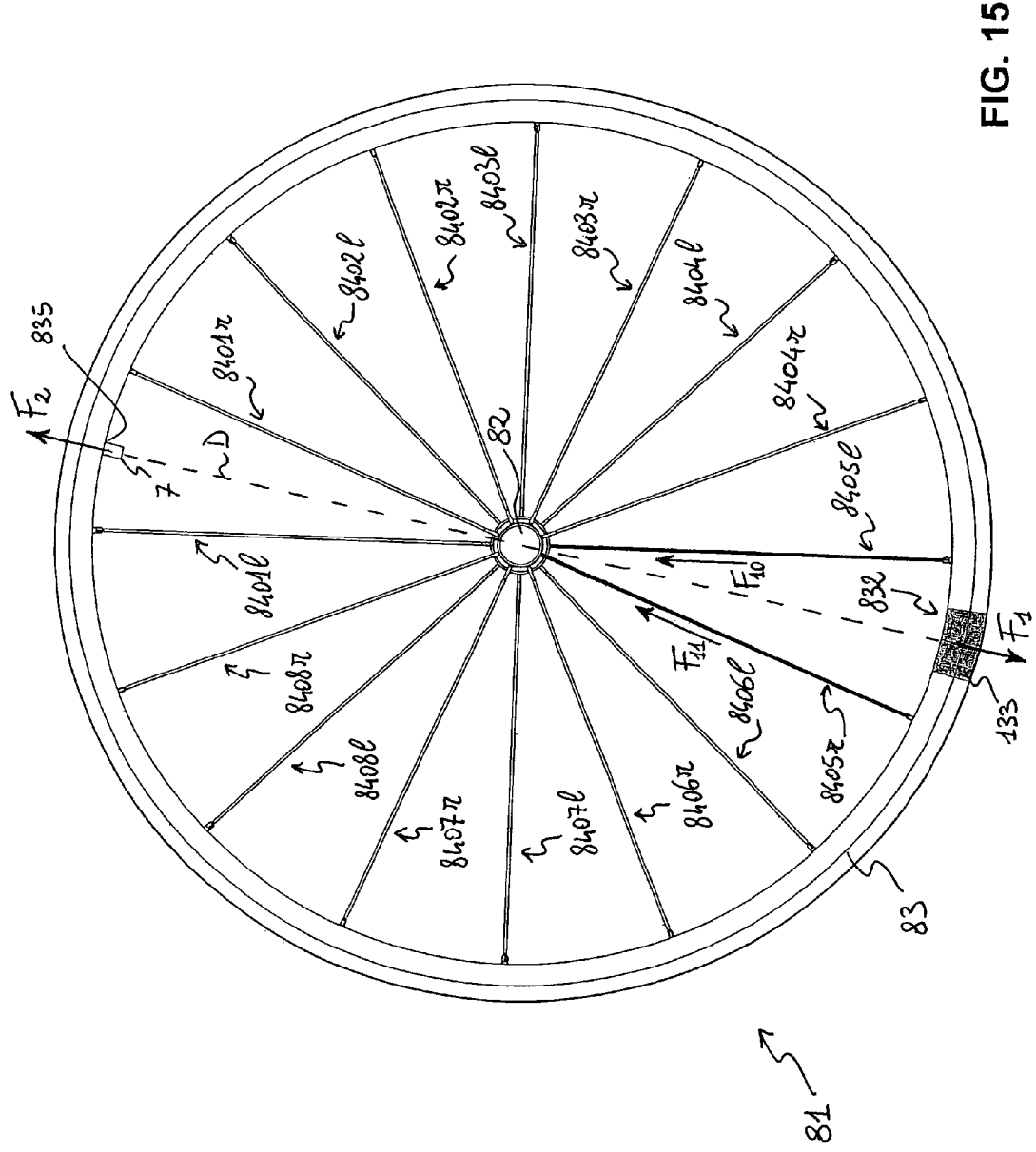
FIG. 15 illustrates a spoked bicycle wheel according to an eighth embodiment.

A wheel 81 according to an eighth embodiment of the invention, represented in FIG. 15, differs from the wheel 71 of FIG. 13 in that both of the spoke connections 8405*r* and 8405*l* adjacent the zone 832 of the joint are of reduced mass with respect to the remaining spoke connections 8401*r*-8404*r*, 8406*r*-8408*r*, 8401*l*-8404*l* and 8406*l*-8408*l*. The spoke connections 8405*r* and 8405*l* are also shown darkened merely for illustrative purposes. Also in this case, sub-sets of spoke connections, for example the connections 8401*l*-8408*l*, could have a different mass ms' than the mass ms, and even equal to the mass of either or both spoke connections 8405*r* and 8405*l*.

The resultant of the forces acting in the wheel 81 under dynamic conditions is expressed by the following formula (11):

$$F=F1+F2+F10+F11 \qquad (11)$$

wherein the forces F10 and F11, which are the effect of the reduced mass of the spoke connections 8405*r* and 8405*l*, are directed inwards, with module $m10*\omega^2*R10$ and $m11*\omega^2*R11$, and the remaining symbols are as described above with reference to the first embodiment.

Also in the case of the wheel 81, it is possible to reduce the dynamic imbalance with respect to a wheel in which all of the sixteen spoke connections are identical to each other, or in any case are such as to form a balanced set, even with very low values, for example 1 or 2 grams, of reduction in mass in the spoke connections 8405*r* and 8405*l* and, with a suitably selected value of such reductions in mass, to eliminate such an imbalance, as illustrated in the following example.

EXAMPLE 5

Let us consider a mass of the zone 832 of the joint of 8.5 grams and a mass of the valve 7 of 6 grams.

A reduction in mass of 2.5 grams of the spokes of each of the spoke connections 8405*r* and 8405*l* allows a wheel 81 that is substantially dynamically balanced to be obtained.

In all of the above embodiments, the increase in mass or the reduction in mass can be obtained, as stated, through a spoke with an intermediate portion of greater cross-section 154 or smaller cross-section 155 decentered towards the outer threading for attachment to the rim, with the advantage of increasing the distance of the center of mass of such a greater or smaller mass from the rotation axis of the wheel and therefore of reducing the necessary value of the mass itself.

An alternative, applicable in all of the embodiments of the invention, consists of differentiating, instead of the mass of the spoke of the spoke connections involved, the masses of their removable connection element 6, in other words differentiating the masses of the internally threaded element or nipple 61 and/or of the plate 62 and/or providing the plate 62 only in the spoke connections of increased mass.

Also in these cases, the difference in mass can be obtained using two different types of material, for example aluminum and brass or steel, or else using different sizes of elements 61, 62 of the same material.

It should be noted that in this case the center of mass of the additional or reduced mass is at a distance from the rotation axis of the wheel substantially equal to the geometric radius of the wheel itself (in fact, equal to the length of the spoke added to the radius of the hub), and therefore additional or reduced masses are necessary that are about half those required in the case of differentiation of the spokes, as exemplified by the following example.

EXAMPLE 6

Under the conditions of example 2, the spokes of the spoke connections 2401*r* and 2401*l* are replaced with spokes identical to the spokes of the remaining spoke connections 2402*r*-2408*r* and 2402*l*-2408*l*. The use of two removable connection elements 2601*r* and 2601*l* with a mass 1.25 grams more than the mass of the remaining removable connection elements 2602*r*-2608*r* and 2602*l*-2608*l* leads to the dynamic balance of the wheel.

Figure 16:
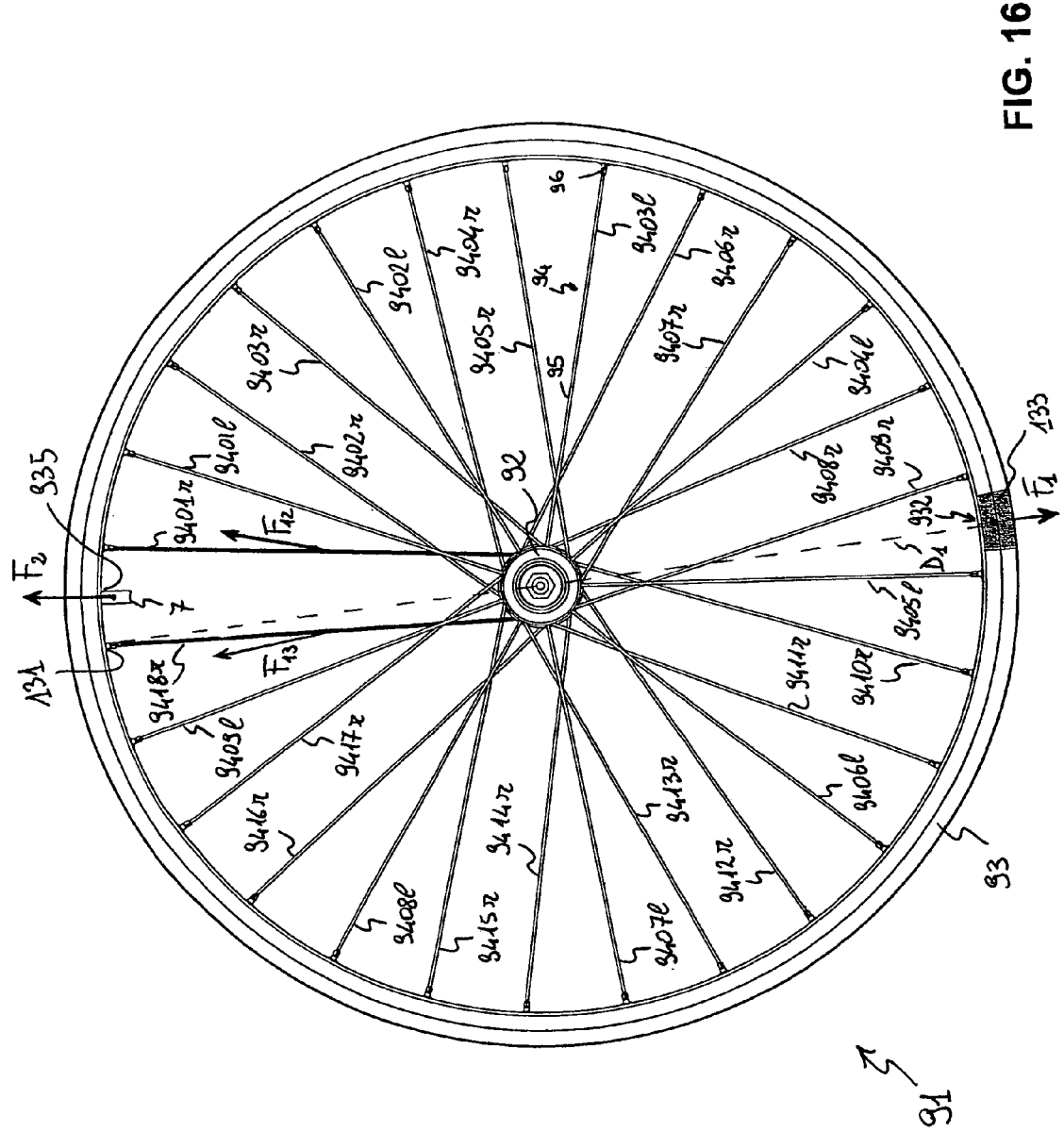
FIG. 16 illustrates a spoked bicycle wheel according to a ninth embodiment.

A wheel 91 according to a ninth embodiment of the invention, in particular a rear wheel, is represented in FIG. 16.

The spoke pattern of the wheel 91 has spoke connections that are distributed equally spaced apart along the circumference of the rim 93, even if they are crossed in triplets close to the hub 92.

The spoke pattern of the wheel 91 comprises an odd number of spoke connections, namely twenty-seven spoke connections, eighteen spoke connections 9401r-9418r on the right hand side of the hub 92 and nine spoke connections 9401l-9409l on the left hand side of the hub 92.

The hole 935 for the valve 7 is not diametrically opposite the zone 932 of the joint, a position where there is one of the seats 131 for a spoke connection 9418r. The hole 935 for the valve 7 is therefore at an angle of about 6.7° (one fifty-fourth of a revolution) with respect to the diameter D1 passing through the zone 932 of the joint.

According to the invention, to reduce the dynamic imbalance of the wheel 91 resulting from the localized masses m1 of the joint 932 and m2 of the valve 7, both of the spoke connections 9401r and 9418r adjacent to the hole 935 for the valve 7 are of increased mass with respect to the remaining spoke connections 9402r-9417r and 9401l-9409l. Also in FIG. 16, the connections of increased mass are shown darkened merely for illustrative purposes.

The mass increase of each of the spoke connections of increased mass 9401r and 9418r shall be selected of a suitable value, not necessarily equal to each other, with reference to the masses of the localized mass increases represented by the valve 7 and by the jointing zone 932, and also with reference to the masses of the remaining spoke connections of the set, which could all be the same or even of different values, for example different from one side of the hub 92 to the other.

The resultant of the centrifugal forces acting in the wheel 91 under dynamic conditions can be expressed by the following formula (12):

$$F = F1 + F2 + F12 + F13 \quad (12)$$

wherein $$F12 = m12 * \omega^2 * R12 \quad (13)$$

$$F13 = m13 * \omega^2 * R13 \quad (14)$$

wherein R12 and R13 stand for the distances from the center of the wheel 91 to the centers of mass of the additional mass m12 of the increased spoke connection 9401r and of the additional mass m13 of the increased spoke connection 9418r, respectively, and the remaining symbols are as described above with reference to the first embodiment.

In case the increased mass of the spoke connections 9401r and 9418r is obtained by two spokes like the spoke shown in FIG. 6 or in FIG. 7, R12 and R13 are substantially equal to half the geometric radius R of the wheel 91 (in fact, equal to half the length of the spoke of spoke connection 9401r or 9418r added to the radius of the hub 92).

It should be noted that the forces F12 and F13, which are the effect of the additional masses m12 and m13 of the spoke connections 9401r and 9418r with respect to the remaining spoke connections, act in the radial direction. It should also be noted that the forces F2, F12 and F13 form an angle of 6.7°, of less than 20° and of less than 6.7°, respectively, with the diameter D1 passing through the zone 332 of the joint. The various centrifugal forces F1, F2, F12, F13 thus act along four different directions. The forces F12 and F13 also strictly speaking lie in a plane parallel to the median plane of the wheel 91, but this effect is totally negligible on the dynamic behavior of the wheel 91.

Also in the case of the wheel 91, it is possible to reduce the dynamic imbalance with respect to a wheel in which all of the twenty-seven spoke connections are identical to each other, or in any case are such as to form a balanced set, even with very low values, for example 1 or 2 grams, of the additional masses of the spoke connections 9401r and 9418r and, with suitably selected values of such additional masses, to eliminate such an imbalance.

Figure 17:
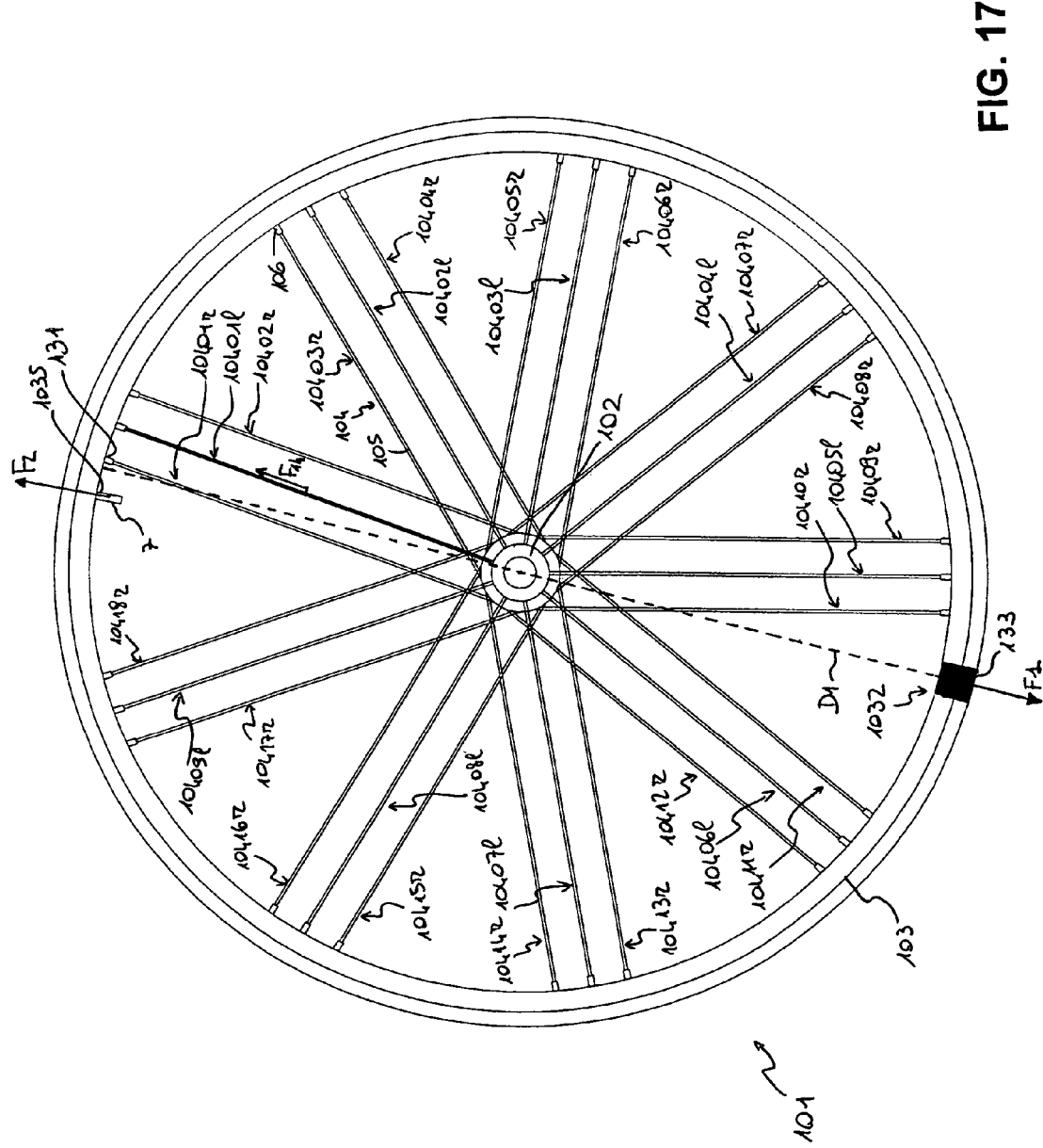
FIG. 17 illustrates a spoked bicycle wheel according to a tenth embodiment.

A wheel 101 according to a tenth embodiment of the invention, in particular a rear wheel, is represented in FIG. 17.

The spoke pattern of the wheel 101 comprises an odd number of spoke connections, namely twenty-seven spoke connections, eighteen spoke connections 10401r-10418r on the right hand side of the hub 102 and nine spoke connections 10401l-10409l on the left hand side of the hub 102. The spoke connections are grouped together in nine triplets.

The hole 1035 for the valve 7 is not diametrically opposite the zone 1032 of the joint, a position very close to where there is one of the seats 131 for a spoke connection 10401r. The hole 1035 for the valve 7 is therefore at a small angle of about 4° with respect to the diameter D1 passing through the zone 1032 of the joint.

According to the invention, to reduce the dynamic imbalance of the wheel 101 resulting from the localized masses m1 of the joint 1032 and m2 of the valve 7, the intermediate spoke connection 10401l of the triplet of spoke connections adjacent the hole 1035 for the valve 7 is of increased mass with respect to the remaining spoke connections 10402l-10409l and 10401r-10418r. Also in FIG. 17, the connection of increased mass 10401l is shown darkened merely for illustrative purposes.

The spoke connection of increased mass 10401l is precisely the one adjacent the spoke connection 10401r essentially diametrically opposite the zone of the joint 1032, on the opposite side with respect to the valve 7, so that the centrifugal force F14 due to its additional mass m14 with respect to the remaining spoke connections, or at least with respect to the remaining spoke connections of a regular sub-set of connections to which it belongs, like for example the sub-set of spoke connections 10401l-10409l, has a component along the diameter D1 passing through the zone of the joint 1032 and a component suitable for partially compensating for the component perpendicular to the direction D1 of the centrifugal force F2 due to the valve 7.

Also in the case of the wheel 101, it is possible to reduce the dynamic imbalance with respect to a wheel in which all of the twenty-seven spoke connections are identical to each other or in any case are such as to form a balanced set, even with very low values, for example 1 or 2 grams, of the additional mass of the spoke connection 10401l and, with suitably selected values of such an additional mass, to substantially eliminate such an imbalance.

Although it is also possible to differentiate the masses of the removable connection elements when these are provided at the hub of the wheel instead of at the rim, such a solution is not particularly advantageous since the distance from the rotation axis would be very small and therefore a very large differentiation of mass would be needed.

Of course, it is also possible to distribute the greater or lesser mass between the spoke and the removable connection element of the spoke connections involved, as well as to use spokes of identical size, but made from two materials having different specific densities, like steel and aluminum or brass and aluminum.

In the previous embodiments the assumption that the mass m1 of the joint is greater than the mass m2 of the valve was always considered, since this is the most common situation.

Those skilled in the art shall, however, understand that in case the mass m1 of the joint is, on the other hand, lower than the mass m2 of the valve, the solutions described up to now shall be applied mutatis mutandis.

It should also be understood that the number of spoke connections of increased or reduced mass need not be only one or two. Just as an example, it is possible to combine the solutions of the first and second embodiment, arranging spoke connections of suitable increased mass 7405l, 7405r, 7406l in the wheel of the first embodiment.

From reading the present description, those skilled in the art shall understand that it is more generally possible to use, in the case of single-piece rims like for example rims made from composite material, any number of spoke connections of increased mass, preferably but not necessarily the same as each other, in the half of the rim opposite the one centered about the single localized mass discontinuity or increase represented by the valve, or else any number of spoke connections of reduced mass in the half of the rim centered about the valve.

In the case of rims with jointing like for example metal rims, it is in general possible to use any number of spoke connections of increased mass in the half of the rim opposite the half centered about the greatest localized mass increase (typically the zone of the joint), or else any number of spoke connections of reduced mass in the half of the rim centered about the greatest localized mass increase.

In such a simple way it is possible to also at least partially compensate for a second smaller localized mass increase, typically the valve.

This occurs, in particular, when the second, smaller localized mass increase is diametrically opposite, or substantially opposite, with respect to the first and therefore the two localized mass increases partially compensate for each other, like in the illustrated embodiments.

However, it must be clear that the present invention is not limited, in the case of rims with jointing like for example metal rims, by the fact that the zone of the joint is diametrically opposite, or substantially opposite, with respect to the valve. Those skilled in the art will understand that in case such elements are closer together it shall be sufficient to increase the mass of the spoke connection(s) of increased mass, which shall be arranged in a suitable position, for example in a position substantially opposite an intermediate position between the joint and the valve, or else to reduce the mass of the spoke connection(s) of reduced mass, which shall be arranged in a suitable position, for example in a position substantially adjacent to the joint.

It is also possible to provide for a separate compensation of the localized mass discontinuities or increases represented by the jointing zone and by the valve, for example providing for one or two spoke connections of increased mass substantially opposite the valve and one or two spoke connections of increased mass substantially opposite the jointing zone, or else one or two spoke connections of reduced mass substantially adjacent to the valve and one or two spoke connections of reduced mass substantially adjacent to the jointing zone, or else one or two connections of increased mass substantially opposite the greatest localized mass increase of the two and one or two connections of reduced mass substantially adjacent to the smallest localized mass increase.

Figure 18:
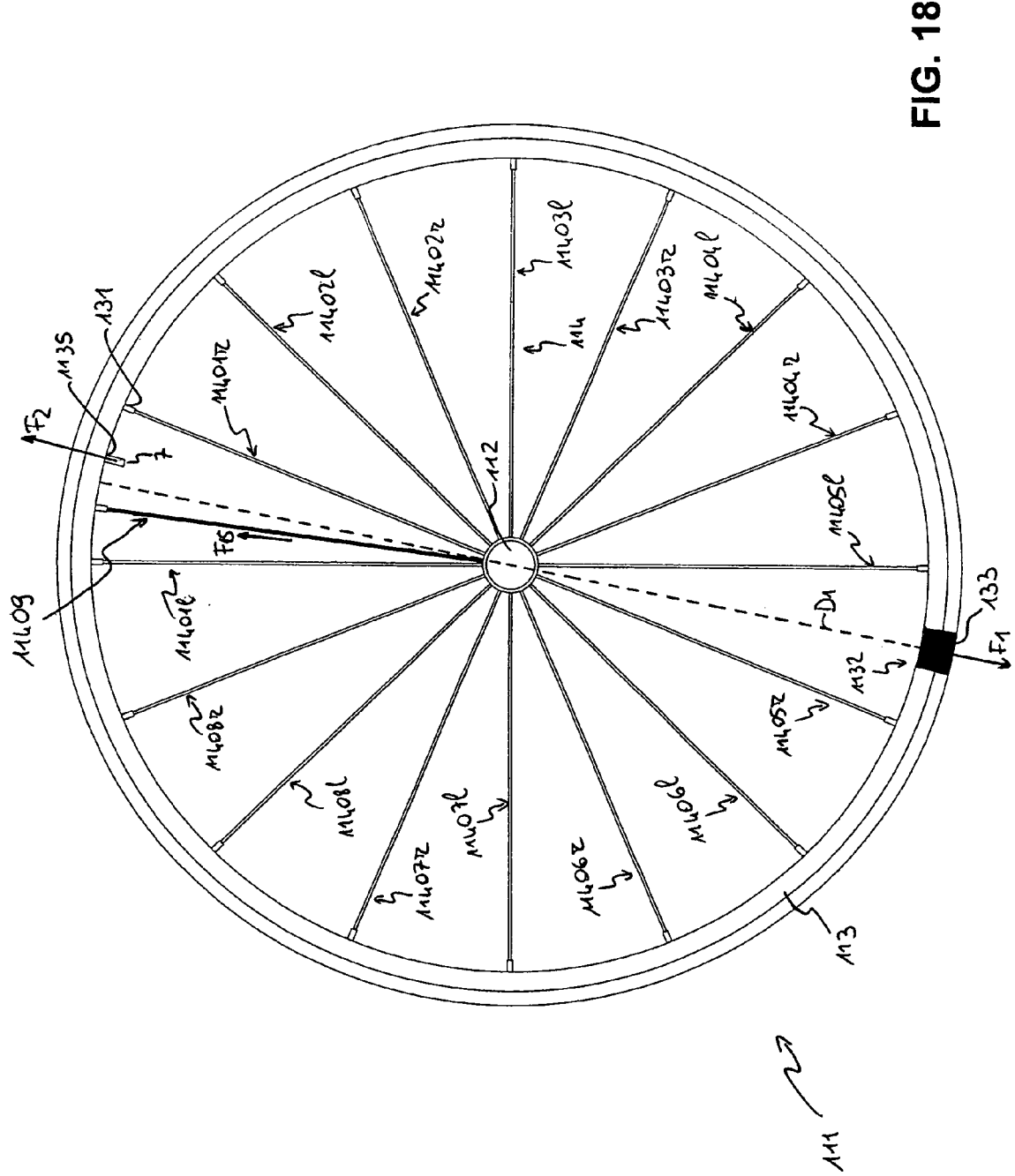
FIG. 18 illustrates a spoked bicycle wheel according to an eleventh embodiment.

FIG. 18 represents a wheel 111, in particular a front wheel, according to an eleventh embodiment of the invention.

The spoke pattern of the wheel 111 may be seen as comprising a regular, balanced sub-pattern comprising sixteen spoke connections 11401l-11408l, 11401r-11408r. According to the invention, to reduce the dynamic imbalance of the wheel 111 resulting from the localized masses m1 of the joint 1132 and m2 of the valve 7, it is provided to use an additional spoke connection 11409, shown darkened for illustrative purposes only.

It is noted that the positions of the overall set of spoke connections 11401l-11408l, 11401r-11408r, 11409 are irregularly arranged about the rotation axis of wheel 111.

The hole 1135 for the valve 7 is not diametrically opposite the zone 1132 of the joint, although in such an opposite position there is none of the seats 131 for the spoke connections. The hole 1135 for the valve 7 is instead at a small angle of about 3.75° with respect to the diameter D1 passing through the zone 1132 of the joint.

The additional spoke connection 11409 is adjacent the position diametrically opposite the zone of the joint 1132, on the opposite side with respect to the valve 7, and at a same angle of 3.75° with diameter D1.

The resultant of the centrifugal forces acting in the wheel 111 under dynamic conditions can be expressed by the following formula (15):

$$F = F1 + F2 + F15 \qquad (15)$$

wherein:

$$F15 = m15 * \omega^2 * R15 \qquad (16)$$

wherein R15 stands for the distance from the center of the wheel 111 to the center of mass of the mass m15 of the additional spoke connection 11409, and the remaining symbols are as described above.

It should be noted that R15 is substantially equal to half the geometric radius R of the wheel 111, actually equal to half the length of the additional spoke 11409 added to the radius of the hub 112.

Furthermore, it is to be noted that the centrifugal force F15 has a component along the diameter D1 passing through the zone of the joint 1132 and a component suitable for at least partially compensating for the component perpendicular to the direction D1 of the centrifugal force F2 due to the valve 7.

With proper values of the mass m15 of the additional spoke 11409, the value of the resultant of the forces F gets close to zero and the dynamic imbalance of the wheel 111 reduces with respect to a wheel in which there are only the sixteen spoke connections 11401l-11408l, 11401r-11408r identical to each other or in any case such as to form a balanced set.

It will be noted that the set of spoke connections of wheel 111 is imbalanced, but once it is connected in the wheel between the hub 112 and the rim 113, and once the valve 7 has been fitted, the wheel 111 is less imbalanced, if not perfectly balanced.

Preferably, the additional spoke connection 11409 will be identical to the other spoke connections 11401l-11408l of the left side of the hub and/or to the other spoke connections 11401r-11408r of the right side of the hub. This obviates the need to manufacture special spoke connections, in particular special spokes, and/or to drill different spoke attachment seats 131 in rim 113.

Mass m3 of the additional spoke connection 11409 may however also be different from the mass of the other spoke connections 11401l-1408l of the left side of the hub and/or of the other spoke connections 11401r-11408r of the right side of the hub.

An additional spoke connection 11409 of different mass may be obtained in any of the numerous ways outlined above.

In particular, when at least part of the additional spoke connection 11409 is made of plastics, the additional spoke connection 11409 will be lighter than spokes 11401*l*-11408*l*, 11401*r*-11408*r* of the balanced sub-set made of metal.

Preferably, moreover, the additional spoke connection 11409 will not be tensioned, so that the wheel 111 will still be balanced from a static point of view.

Figure 19:
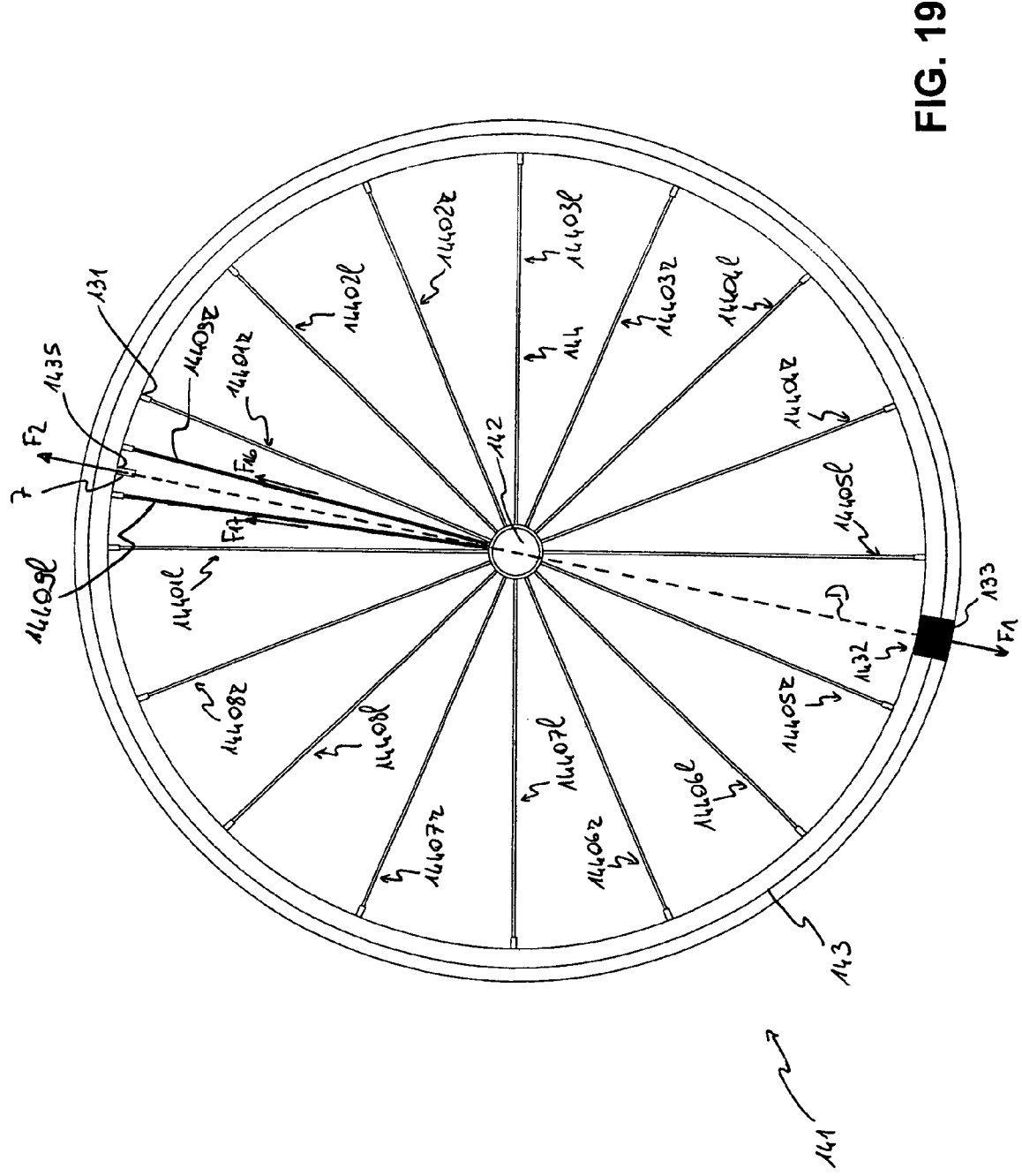
FIG. 19 illustrates a spoked bicycle wheel according to a twelfth embodiment.

FIG. 19 represents a wheel 141, in particular a front wheel, according to a twelfth embodiment of the invention.

The spoke pattern of the wheel 141 may again be seen as comprising a regular, balanced sub-pattern comprising sixteen spoke connections 14401*l*-14408*l*, 14401*r*-14408*r*. According to the invention, to reduce the dynamic imbalance of the wheel 141 due to the localized masses m1 of the joint 1432 and m2 of the valve 7, it is provided to use two additional spoke connections 14409*l* and 14409*r*, shown darkened for illustrative purposes only.

In the wheel 141, the hole 1435 for the valve 7 is diametrically opposite the zone 1432 of the joint.

The additional spoke connections 14409*l* and 14409*r* are adjacent the hole 1435 for the valve 7, on opposite sides thereof with respect to the valve 7.

The resultant of the centrifugal forces acting in the wheel 141 under dynamic conditions can be expressed by the following formula (17):

$$F = F1 + F2 + F16 + F17 \quad (17)$$

wherein $$F16 = m16 * \omega^2 * R16 \quad (18)$$

$$F17 = m17 * \omega^2 * R17 \quad (19)$$

wherein R16 and R17 stand for the distances from the center of the wheel 141 to the centers of mass of the mass m16 of the additional spoke connection 14409*l* and of the mass m17 of the additional spoke connection 14409*r*, respectively, and the remaining symbols are as described above.

It should be noted that the forces F16 and F17 each form an angle of 3.75° with the diameter D extending between the zone of the joint 1432 and the valve 7, the diameter along which the forces F1 and F2 act, in opposite directions. The resultant of the two forces F16 and F17 therefore acts along the diameter D. The forces F16 and F17 also strictly speaking lie in planes parallel to the median plane of the wheel 141, but on opposite sides, and their effect is totally negligible on the dynamic behavior of the wheel 21.

With proper values of the additional mass m16 and m17, the dynamic imbalance of the wheel 141 is reduced with respect to a wheel in which there are only the sixteen spoke connections 14401*l*-14408*l*, 14401*r*-14408*r* identical to each other or in any case such as to form a balanced set.

The imbalance resulting from the presence of the sleeve 133 or other type of joint and of the valve 7 can in such a case be totally cancelled out with a suitable selection of values m16 and m17, obtaining perfect balance.

It will be noted that also the set of spoke connections of wheel 141 is imbalanced, but once it is connected in the wheel between the hub 142 and the rim 143, and once the valve 7 has been fitted, the wheel 141 is less imbalanced, if not perfectly balanced.

Also in this case, the additional spoke connections 11409*l* and 11409*r* will preferably be identical to the other sixteen spoke connections, to avoid the need for special manufacture, and not tensioned, so that the wheel 141 will still be balanced from a static point of view.

It will be understood that an unbalanced set of spoke connections, that will dynamically balance the wheel once mounted and fitted with valve 7, may be obtained by additional spoke connections like in the eleventh and twelfth embodiments also in different spoke patterns, such as in spoke patterns comprising an odd number of spoke connections as shown e.g. in FIG. 10 and FIG. 11; in spoke patterns comprising groups of spokes, such as triplets, irrespectively of the number of spoke connections, as shown in FIG. 12 or in FIG. 17; in rims made of composite material, thus lacking a joint, like those shown in FIG. 11 and in FIG. 12.

It will further be understood that the number of additional spoke connections need not be only one or two, and that they need not be arranged in the same intraspoke zone as the valve or, more in general, as the lightest mass increase. Instead, the additional spoke connection(s) may be arranged in intraspoke zone(s) adjacent the intraspoke zone containing the lightest localized mass increase.

In the case of rims with jointing like for example metal rims, it is in general possible to use any number of additional spoke connections in the half of the rim opposite the half centered about the greatest localized mass increase (typically the zone of the joint).

When the zone of the joint is not diametrically opposite, or substantially opposite, with respect to the valve, a suitable number of additional spoke connection(s) of a suitable mass shall be arranged in a suitable position, for example in a position substantially opposite an intermediate position between the joint and the valve.

It is also possible to provide for a separate compensation of the localized mass discontinuities or increases represented by the jointing zone and by the valve, for example providing for one or two additional spoke connections substantially opposite the valve and one or two additional spoke connections substantially opposite the jointing zone.

Like in the case of the spoke connections of increased mass, in the case of single-piece rims like for example rims made from composite material, it will be possible to use any number of additional spoke connections, preferably but not necessarily of the same mass, in the half of the rim opposite the one centered about the single localized mass discontinuity or increase represented by the valve.

Finally, while it is preferred to retain a subset of spoke connections that is balanced with respect to the axis of rotation of the wheel to easily obtain balance from a static point of view by not tensioning the additional spoke connection(s), those skilled in the art will understand that this is not mandatory within the invention. Indeed, it will be possible to devise a number of other spoke patterns that are so imbalanced as to cause perfect balance of the wheel once the valve is fitted, and that also perform well from a static point of view.

The set will comprise denser regions, i.e. with a greater number of spoke connections, and less dense regions, i.e. with a smaller number of spoke connections, the criteria for their arrangement with respect to the localized mass increase(s) of the wheel being analogous to the criteria outlined above for arranging spoke connection(s) of a different mass within a regular sub-set of spoke connections of the wheel.

The invention claimed is:

1. A spoked bicycle wheel comprising a hub, a rim and a set of spoke connections connecting the hub and the rim, wherein said set comprises at least one spoke connection of a different mass at least than the remaining spoke connections in a sub-set of spoke connections regular with respect to the wheel's axis of rotation, each spoke connection comprises a spoke and a removable connection element at a first end of said spoke for removable connection with the rim or with the hub, the spoke of at least one spoke connection having a different mass than the spokes of other spoke connections, the masses of the set of spoke connections as a whole are imbalanced with respect to the wheel's axis of rotation.

2. The wheel of claim 1, wherein the imbalance with respect to the wheel's axis of rotation of the set of spoke connections compensates for an imbalance due to at least one localized mass increase of the wheel.

3. The wheel of claim 1, wherein said at least one spoke connection of different mass is a single spoke connection.

4. The wheel of claim 1, wherein said at least one spoke connection of different mass are two spoke connections.

5. The wheel of claim 1, wherein said at least one spoke of different mass comprises first and second end portions and an intermediate portion having a different cross-sectional area than the end portions.

6. The wheel of claim 5, wherein the intermediate portion is flattened.

7. The wheel of claim 5, wherein the intermediate portion is central with regards to the first and second end portions.

8. The wheel of claim 5, wherein the intermediate portion is closer to an end portion of the spoke towards the rim.

9. The wheel of claim 1, wherein each spoke connection comprises a spoke and a removable connection element at a first end of said spoke for removable connection with the rim or with the hub, the removable connection element of at least one spoke connection having a different mass than the removable element of the remaining spoke connections.

10. The wheel of claim 9, wherein said at least one removable connection element of different mass connects to the rim.

11. The wheel of claim 9, wherein each removable connection element comprises an internally threaded element coupled with an outer threading of an end of a spoke, and wherein the internally threaded element of at least one spoke connection has a different mass than the internally threaded element of the remaining spoke connections.

12. The wheel of claim 9, wherein each removable connection element comprises an internally threaded element couplable with an outer threading of an end of a spoke and an abutment plate, and wherein the abutment plate of at least one spoke connection has a different mass than the abutment plate of the remaining spoke connections.

13. The wheel of claim 9, wherein each removable connection element comprises an internally threaded element couplable with an outer threading of an end of a spoke, and wherein the removable connection element of at least one spoke connection comprises an additional abutment plate with respect to the remaining spoke connections.

14. A spoked bicycle wheel comprising a hub, a rim comprising a joint zone, a plurality of spoke connections that connect the hub and the rim, and a valve fitted to the rim essentially diametrically opposite the joint zone, a mass of the valve being less than a mass of the joint zone, wherein the spoke connections comprise a pair of spoke connection of increased mass with respect to the remaining spoke connections, arranged adjacent to the valve at either side thereof.

15. A spoked bicycle wheel comprising a hub, a rim and a plurality of spoke connections that connect the hub and the rim, wherein the spoke connections comprise at least one spoke connection of increased mass with respect to the remaining spoke connections arranged to counteract an imbalance with respect to the wheel's axis of rotation, said imbalance resulting from at least one localized mass increase of the rim, and wherein a spoke of said at least one spoke connection of increased mass comprises first and second ends, and an intermediate portion having a greater cross-sectional area than its end portions.

* * * * *